(12) United States Patent
Sagae et al.

(10) Patent No.: US 10,341,266 B2
(45) Date of Patent: Jul. 2, 2019

(54) E-MAIL RELAY DEVICE, E-MAIL RELAY METHOD, AND NON-TRANSITORY STORAGE MEDIUM

(71) Applicant: NEC CORPORATION, Tokyo (JP)

(72) Inventors: Akihiro Sagae, Tokyo (JP); Takeshi Chiba, Tokyo (JP)

(73) Assignee: NEC CORPORATION, Tokyo (JP)

(*) Notice: Subject to any disclaimer, the term of this patent is extended or adjusted under 35 U.S.C. 154(b) by 65 days.

(21) Appl. No.: 15/210,980

(22) Filed: Jul. 15, 2016

(65) Prior Publication Data

US 2017/0019354 A1    Jan. 19, 2017

(30) Foreign Application Priority Data

Jul. 16, 2015 (JP) ................................ 2015-142131

(51) Int. Cl.
*H04L 12/58* (2006.01)
*H04N 1/00* (2006.01)
(Continued)

(52) U.S. Cl.
CPC ............ *H04L 51/00* (2013.01); *H04L 45/745* (2013.01); *H04L 51/24* (2013.01); *H04L 51/30* (2013.01);
(Continued)

(58) Field of Classification Search
CPC ......... H04L 51/00; H04L 51/24; H04L 51/28; H04L 51/30; H04L 51/08; H04L 51/18;
(Continued)

(56) References Cited

U.S. PATENT DOCUMENTS

2006/0192990 A1* 8/2006 Tonegawa .......... H04N 1/00209
                                                          358/1.15
2013/0191886 A1* 7/2013 Goyal .................... H04L 51/12
                                                          726/5
(Continued)

FOREIGN PATENT DOCUMENTS

JP      2002-269012 A    9/2002
JP      2010-113447 A    5/2010
JP      2013-232828 A   11/2013

OTHER PUBLICATIONS

KDDI Corp, JP 2010-113447, 201—May 20, English translation.*
Communication dated Feb. 21, 2017 from the Japanese Patent Office in counterpart application No. 2015-142131.

*Primary Examiner* — Jianye Wu
(74) *Attorney, Agent, or Firm* — Sughrue Mion, PLLC

(57) ABSTRACT

Provided is an e-mail relay device including: an e-mail receiving unit that acquires an e-mail to be delivered before the e-mail reaches a transmission destination, the e-mail being transmitted from a transmission source mailer through simple mail transfer protocol (SMTP); a request notification unit that transmits, after the e-mail receiving unit acquires the e-mail to be delivered, a notification e-mail for allowing communication with a predetermined authentication server through IP by using a transmission source e-mail address of the e-mail to be delivered as a destination; a transmission source IP address acquisition unit that acquires, in a case where the transmission source terminal communicates with the predetermined authentication server after the notification e-mail is transmitted, an IP address of a transmission source terminal contained in an IP header of an IP packet transmitted/received during the communication; and a determination unit that determines the reliability of the e-mail to be delivered based on the IP address of the transmission source terminal.

11 Claims, 19 Drawing Sheets

(51) Int. Cl.
*H04L 12/741* (2013.01)
*H04L 29/06* (2006.01)
*H04L 29/12* (2006.01)

(52) U.S. Cl.
CPC .......... *H04L 63/08* (2013.01); *H04L 63/0876* (2013.01); *H04L 63/1441* (2013.01); *H04L 69/16* (2013.01); *H04L 69/22* (2013.01); *H04N 1/00217* (2013.01); *H04L 51/08* (2013.01); *H04L 51/28* (2013.01); *H04L 61/1511* (2013.01); *H04L 2463/146* (2013.01); *H04Q 2213/13095* (2013.01)

(58) Field of Classification Search
CPC ....... H04L 45/745; H04L 69/22; H04L 69/16; H04L 69/1511; H04L 63/08; H04L 61/1511; H04L 63/0876; H04L 63/1441; H04L 2463/146; H04N 1/00217; H04Q 2213/13095
See application file for complete search history.

(56) References Cited

U.S. PATENT DOCUMENTS

2013/0329245 A1* 12/2013 Nishida .............. G06K 15/4095
 358/1.14
2015/0026782 A1* 1/2015 Nishida .................. H04L 63/08
 726/6

* cited by examiner

FIG. 3

| SUBJECT | E-MAIL AUTHENTICATION NOTIFICATION |
|---|---|
| RECEPTION DATE | 2015/6/09 13:37 |
| To | xxxx@aaa.ccc.com |
| From | posmastar@aaa.bbb.com |

AN E-MAIL HAS BEEN TRANSMITTED from xxxx@aaa.ccc.com to ○○○@aaa.bbb.com AT 2015/06/08 15:12

NO HISTORY OF TRANSMISSION AND RECEPTION OF THE SENDER'S E-MAIL ADDRESS HAS BEEN FOUND IN OUR E-MAIL SERVER. PLEASE ACCESS THE FOLLOWING URL TO EXECUTE AN AUTHENTICATION PROCESS.

https://aaa.bbb.com/90791720380-183000.jsp

THE TRANSMITTED E-MAIL IS AS FOLLOWS. IF THIS E-MAIL HAS BEEN TRANSMITTED TO YOU IN ERROR, PLEASE DISCARD THIS E-MAIL.

> ----- E-MAIL INFORMATION -----
> From: xxxx@aaa.ccc.com
> TRANSMISSION DATE: Monday, June 08, 2015 10:47 AM
> To: ○○○@aaa.bbb.com
> Subject: INQUIRY TO YOUR COMPANY

FIG. 8

WHITELIST

| TRANSMISSION SERVER IP ADDRESS |
|---|
| 116.○○○.○○○.○○○ |
| 116.○○○.○○○.○○○ |
| . . . . |
| 200.○○○.○○○.○○○ |

| ENVELOPE FROM |
|---|
| abc@nec.co.jp |
| def@nec.co.jp |
| . . . . |
| *@○×△.co.jp |

FIG. 15

WHOIS INFORMATION

| Domain Information: [DOMAIN INFORMATION] | |
|---|---|
| a. [DOMAIN NAME] | ○×△.CO.JP |
| e. [ORGANIZATION NAME] (IN HIRAGANA CHARACTERS) | ○×△ CORPORATION |
| f. [ORGANIZATION NAME] (IN KANJI CHARACTERS) | ○×△ CORPORATION |
| g. [Organization] | ○×△ Corporation |
| k. [ORGANIZATION TYPE] (IN KANJI CHARACTERS) | CORPORATION |
| l.. [Organization Type] | corporation |
| m. [PERSON IN CHARGE OF REGISTRATION] | ○×△JP |
| n. [TECHNICAL LIAISON] | abc.gate.○×△JP.co.jp |
| p. [NAME SERVER] | |
| s. [SIGNATURE KEY] | |
| [STATE] | Connected (2015/03/31) |
| [DATE OF REGISTRATION] | |
| [DATE OF CONNECTION] | 2013/12/11 |
| [FINAL UPDATE] | 2014/06/11 10:38:48 (JST) |

FIG. 18

| | RECEPTION BOX | |
|---|---|---|
| | SUBJECT | RECEPTION DATE |
| | UPLOAD REQUEST NOTIFICATION | 2015/2/26 13:37 |
| | ..... | 2015/2/27 14:37 |
| | ..... | 2015/2/28 15:37 |
| SUBJECT | UPLOAD REQUEST NOTIFICATION | |
| RECEPTION DATE | 2013/3/26 13:37 | |
| To | xxxx@aaa.ccc.com | |
| From | posmastar@aaa.bbb.com | |

RECEPTION BOX
○×△
◆■★
□◇×
□●×

TRANSMISSION BOX

TRASH BOX

PLEASE ACCESS THE FOLLOWING SITE TO UPLOAD FILE ATTACHED TO E-MAIL SENT TO ○○ AT [2015/2/16 13:36].

https://aaa.bbb.com/ttffasououfoul90791720380-183000.html

FIG. 19

| RECEPTION BOX | |
|---|---|
| SUBJECT | RECEPTION DATE |
| MINUTES OF MEETING | 2015/2/26 13:36 |
| ..... | 2015/2/27 14:37 |
| ..... | 2015/2/28 15:37 |

Sidebar:
- RECEPTION BOX
- ○×△
- TRANSMISSION BOX
- TRASH BOX

| SUBJECT | MINUTES OF MEETING |
|---|---|
| RECEPTION DATE | 2013/3/26 13:37 |
| To | xxxx@aaa.ccc.com |
| From | xxxxxx@xxx.xxx.com |

TO Mr./Ms. ○○

HELLO, THIS IS XX OF □□ CORPORATION.
PLEASE FIND ATTACHED THE MINUTES OF THE RECENT MEETING.

[COMMUNICATION FROM E-MAIL SYSTEM]
PLEASE DOWNLOAD THE ATTACHED FILE FROM BELOW.
https://aaa.bbb.com/ttffasououpload90791720380-183000.html
} ATTACHED FILE DOWNLOAD DESTINATION NOTIFICATION

[UPLOADER INFORMATION]
WHOIS INFORMATION OF SENDER
....
IP REPUTATION INFORMATION
....
} TRANSMISSION SOURCE INFORMATION

E-MAIL RELAY DEVICE, E-MAIL RELAY METHOD, AND NON-TRANSITORY STORAGE MEDIUM

This application is based on Japanese patent application No. 2015-142131, the content of which is incorporated hereinto by reference.

BACKGROUND

Technical Field

The present invention relates to an e-mail relay device, an e-mail relay method, and a program.

Related Art

A targeted e-mail is a spam e-mail targeting a specific target and feigning to be a valid e-mail for that target. Since the targeted e-mails, unlike other spam e-mails, are devised by humans, it is difficult to automatically perform a spam check.

Targeted e-mails are often attached with files. If a person is deceived by the described contents of the e-mail and ends up opening the attached file, there occurs the situation of being infected with a virus.

Hitherto, there have been the following measures against spam e-mails.

(1) A method of managing the IP address or domain of a server which has weak security and is used as a springboard or a server sending out a lot of spam e-mails, by blacklisting the address or domain, and taking measures against e-mails from such a server.

(2) A method of registering e-mail data (text, attached file, and addressed URL) reported as spam e-mail in a spam database in advance, and collating the database for an e-mail to verify whether or not there is a match for the e-mail.

Japanese Unexamined Patent Application Publication No. 2010-113447 discloses a technique in which, when an e-mail is received, determination is made on whether the e-mail is spam e-mail based on the feature of a transmission source e-mail server.

The method of (1) has the following problem. In a case where an exchange using simple mail transfer protocol (SMTP) is performed, the Internet protocol (IP) address of an e-mail transmission source could not be specified, and only the IP address of an e-mail server which is used by the e-mail transmission source or an e-mail server through which e-mail has passed is able to be specified.

Consequently, as in the technique disclosed in Japanese Unexamined Patent Application Publication No. 2010-113447, using a unit that determines whether an e-mail is spam e-mail based on the feature of the e-mail server used by the e-mail transmission source may be considered. However, in a case where the e-mail transmission source uses an e-mail server of an Internet service provider (ISP), an open proxy server, a free e-mail server, or the like as the e-mail server, identity information may be concealed, and thus it is difficult to check the reliability of the e-mail. In a case where such an e-mail server is used, it is difficult to apply a method of verifying the e-mail transmission source through transmission domain verification.

Generally, in SMTP, since e-mail servers to be used can be substantially freely selected, there is a problem in that information of an e-mail transmission source is insufficient, and that the verification thereof is not able to be performed.

The method of (2) has the following problem. It is often the case that targeted e-mails are customized for a specific target, and are data unique to e-mail text or an attached file. For this reason, since these e-mails take patterns which are not registered in a spam database in advance, it is difficult to detect the e-mails by this method.

An object of the present invention is to provide a new technique for determining the reliability of an e-mail.

SUMMARY

In one exemplary embodiment, there is provided an e-mail relay device including:

a memory configured to store program instructions; and a processor configured to execute the program instructions including:

an e-mail receiving unit that acquires an e-mail to be delivered before the e-mail reaches a transmission destination, the e-mail being transmitted from a transmission source mailer through simple mail transfer protocol (SMTP);

a request notification unit that transmits, after the e-mail receiving unit acquires the e-mail to be delivered, a notification e-mail for allowing communication with a predetermined authentication server through Internet protocol (IP) by using a transmission source e-mail address of the e-mail to be delivered as a destination;

a transmission source IP address acquisition unit that acquires, after the notification e-mail has been transmitted, and in a case a transmission source terminal communicates with the predetermined authentication server, an IP address of the transmission source terminal contained in an IP header of an IP packet transmitted/received during the communication; and a determination unit that determines the reliability of the e-mail to be delivered based on the IP address of the transmission source terminal.

In another exemplary embodiment, there is provided an e-mail relay method executed by a computer, the method including:

an e-mail receiving step of acquiring an e-mail to be delivered before the e-mail reaches a transmission destination, the e-mail being transmitted using SMTP from a transmission source mailer;

a request notification step of transmitting, after the e-mail to be delivered is acquired in the e-mail receiving step, a notification e-mail for allowing communication with a predetermined authentication server over IP by using a transmission source e-mail address of the e-mail to be delivered as a destination;

a transmission source IP address acquisition step of acquiring, in a case where the transmission source terminal communicates with the predetermined authentication server after the notification e-mail is transmitted, an IP address of a transmission source terminal contained in an IP header of an IP packet transmitted/received during the communication; and a determination step of determining the reliability of the e-mail to be delivered based on the IP address of the transmission source terminal.

In still another exemplary embodiment, there is provided a non-transitory storage medium storing a program causing a computer to function as:

an e-mail receiving unit that acquires an e-mail to be delivered before the e-mail reaches a transmission destination, the e-mail being transmitted using SMTP from a transmission source mailer;

a request notification unit that transmits, after the e-mail receiving unit acquires the e-mail to be delivered, a notification e-mail for allowing communication with a predetermined authentication server over IP by using a transmission source e-mail address of the e-mail to be delivered as a destination;

a transmission source IP address acquisition unit that acquires, in a case a transmission source terminal communicates with the predetermined authentication server after the notification e-mail is transmitted, an IP address of the transmission source terminal contained in an IP header of an IP packet transmitted/received during the communication; and a determination unit that determines the reliability of the e-mail to be delivered based on the IP address of the transmission source terminal.

According to the present invention, it is possible to achieve a new technique for determining the reliability of an e-mail.

BRIEF DESCRIPTION OF THE DRAWINGS

The above and other objects, advantages and features of the present invention will be more apparent from the following description of certain preferred exemplary embodiments taken in conjunction with the accompanying drawings, in which:

FIG. 3 is a diagram illustrating an example of a notification e-mail which is transmitted to a transmission source user by the e-mail relay device of the present exemplary embodiment;

FIG. 8 is a diagram schematically illustrating an example of a whitelist which is used by the e-mail relay device of the present exemplary embodiment;

FIG. 15 is a diagram schematically illustrating an example of information which is acquired in a WHOIS lookup by the e-mail relay device of the present exemplary embodiment;

FIG. 18 is a diagram illustrating an example of the notification e-mail which is transmitted to the transmission source user by the e-mail relay device of the present exemplary embodiment; and FIG. 19 is a diagram illustrating an example of an e-mail provided with new information by the e-mail relay device of the present exemplary embodiment and transmitted to a transmission destination.

DETAILED DESCRIPTION

The invention will be now described herein with reference to illustrative exemplary embodiments. Those skilled in the art will recognize that many alternative exemplary embodiments can be accomplished using the teachings of the present invention and that the invention is not limited to the exemplary embodiments illustrated for explanatory purposes.

First, an example of a hardware configuration of a device (e-mail relay device) of the present exemplary embodiment will be described. Each unit provided with the device of the present exemplary embodiment is embodied by any combination of hardware and software based on a central processing unit (CPU) of any computer, a memory, a program loaded into the memory, a storage unit (capable of storing a program downloaded from a recording medium such as a compact disc (CD), a server on the Internet, or the like, in addition to a program stored from a step of shipping a device in advance) such as a hard disk having the program stored thereon, and an interface for network connection. It will be understood by those skilled in the art that embodying methods and devices thereof may be modified in various ways.

Figure 1:
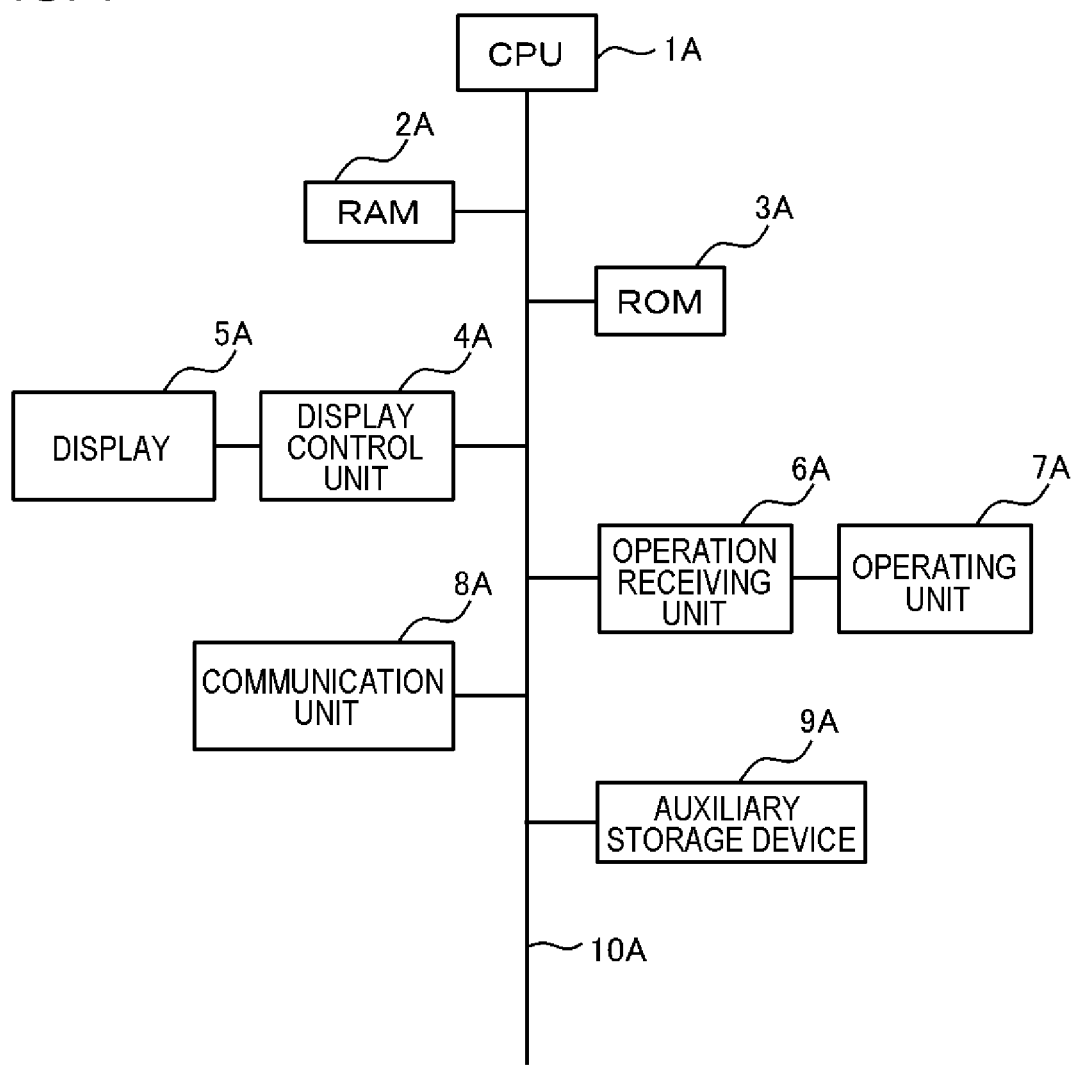
FIG. 1 is a diagram conceptually illustrating an example of a hardware configuration of an e-mail relay device of the present exemplary embodiment.

FIG. 1 is a diagram conceptually illustrating an example of a hardware configuration of the device (e-mail relay device) of the present exemplary embodiment. As shown in FIG. 1, the device of the present exemplary embodiment includes, for example, a CPU 1A, a random access memory (RAM) 2A, a read only memory (ROM) 3A, a communication unit 8A, an auxiliary storage device 9A, and the like which are connected to each other through a bus 10A. Meanwhile, the device of the present exemplary embodiment may further include a display control unit 4A, a display 5A, an operation receiving unit 6A, an operating unit 7A, and the like. In addition, although not shown in the drawing, the device of the present exemplary embodiment may include other elements such as a microphone and a speaker, in addition thereto. In addition, the device may not include some of the elements shown in the drawing.

The CPU 1A controls the entire computer of the device together with each element. The ROM 3A includes an area for storing programs for bringing the computer into operation, various application programs, various setting data used when these programs operate, and the like. The RAM 2A includes an area, such as a work area in order for programs to operate, in which data is temporarily stored. The auxiliary storage device 9A is, for example, a hard disk drive (HDD), and can store high-capacity data.

The display 5A is, for example, a display device (such as a light emitting diode (LED) indicator, a liquid crystal display, or an organic electro luminescence (EL) display). The display 5A may be a touch panel display integrated with a touch pad. The display control unit 4A performs various screen displays by reading out data stored in a video RAM (VRAM), performing a predetermined process on the readout data, and then sending the data to the display 5A. The operation receiving unit 6A receives various operations through the operating unit 7A. The operating unit 7A includes an operation key, an operation button, a switch, a jog dial, a touch panel display, a keyboard, and the like. The communication unit 8A is connected to a network such as the Internet or a local area network (LAN) in a wired and/or wireless manner, and communicates with other electronic apparatuses. In addition, the communication unit 8A is directly connected to other electronic apparatuses in a wired and/or wireless manner, and can perform communication therewith.

Hereinafter, the exemplary embodiments will be described. Meanwhile, each functional block diagrams which is used in the description of the following exemplary embodiments represents a function-based block rather than a hardware-based configuration. In the following drawings, each device is described to be embodied by one apparatus, but its embodying unit is not limited thereto. That is, the respective devices may be physically disconnected from each other, and may be logically disconnected from each other. Meanwhile, the same components are denoted by the same reference numerals and signs, and thus the description thereof will not be repeated.

First Exemplary Embodiment

First, the outline of the present exemplary embodiment will be described. An e-mail relay device of the present exemplary embodiment acquires an e-mail to be delivered before the e-mail reaches a transmission destination, the e-mail being transmitted using SMTP from a transmission source mailer. The e-mail relay device then transmits a notification e-mail for allowing communication with a predetermined authentication server over IP, with the destination being the transmission source e-mail address of the acquired e-mail to be delivered. For example, the device transmits a notification e-mail containing the URL of an authentication server and a message to prompt access to the URL in the text.

In a case where a transmission source terminal communicates with the predetermined authentication server in accordance with the notification e-mail, the e-mail relay device acquires the IP address of the transmission source terminal contained in the IP header of an IP packet transmitted/received during the communication. The e-mail relay device determines the reliability of the e-mail to be delivered based on the acquired IP address of the transmission source terminal.

Figure 2:
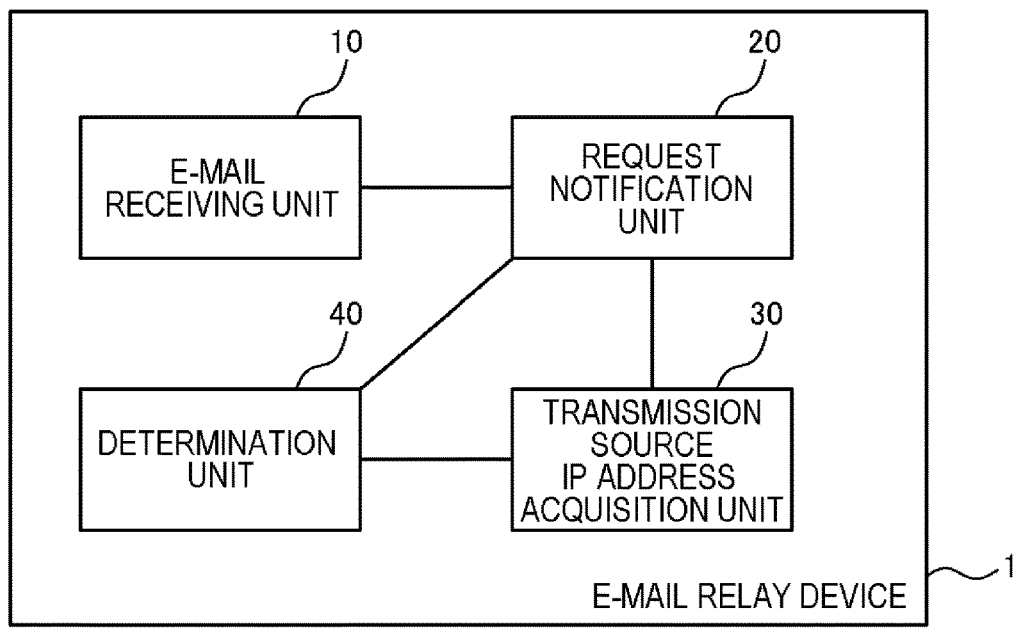
FIG. 2 is an example of a functional block diagram of the e-mail relay device of the present exemplary embodiment.

Next, the configuration of the present exemplary embodiment will be described in detail. FIG. 2 shows an example a functional block diagram of an e-mail relay device 1 of the present exemplary embodiment. As shown in FIG. 2, the e-mail relay device 1 includes an e-mail receiving unit 10, a request notification unit 20, a transmission source IP address acquisition unit 30, and a determination unit 40.

The e-mail relay device 1 may be configured to be logically integrated with an e-mail server. For example, the e-mail server may include the configuration of the e-mail relay device 1. In this case, the e-mail server and the e-mail relay device 1 may be configured to be physically integrated with each other, and may be configured to be physically disconnected from each other. In a case of physical disconnection therebetween, the e-mail relay device 1 and the e-mail server are communicably connected to each other through any communication unit.

Besides, the e-mail relay device 1 may be configured to be logically disconnected from the e-mail server. That is, the e-mail server and the e-mail relay device 1 may be separately provided. For example, an example may be considered in which the e-mail relay device 1 is externally attached to an existing e-mail server exclusive of the configuration of the e-mail relay device 1, the existing e-mail server and the e-mail relay device 1 are communicably connected to each other through any communication unit, or these elements are caused to cooperate with each other.

The e-mail receiving unit 10 of FIG. 2 acquires an e-mail to be delivered which is transmitted using SMTP from the transmission source mailer before the e-mail reaches the transmission destination. The e-mail to be delivered is constituted by an envelope, a header, DATA (e-mail text and attached file), and the like.

A transmission source user executes predetermined e-mail software (transmission source mailer) using a predetermined transmission source terminal, and transmits the e-mail to be delivered, using a predetermined mail address as a destination.

The transmission source terminal may be, for example, a personal computer, a tablet, a cellular phone, a smartphone, or the like. The e-mail software is software for performing the creation of e-mail text, the transmission and reception of an e-mail, the management of an e-mail, and the like, and may be called a mailer.

The transmission destination is an e-mail box provided in the e-mail server, and is associated with an e-mail address.

The e-mail to be delivered which is transmitted from the transmission source mailer is transmitted to a predetermined e-mail server (hereinafter, "transmission source e-mail server") which is used by the transmission source user. Thereafter, the e-mail to be delivered is transmitted from the transmission source e-mail server to the e-mail server of the transmission destination (hereinafter, "transmission destination e-mail server"). The e-mail to be delivered is stored in an e-mail box (transmission destination) corresponding to a destination e-mail address which is managed by the transmission destination e-mail server.

The e-mail receiving unit 10 acquires the e-mail to be delivered before the e-mail is stored in the e-mail box corresponding to the destination e-mail address. In a case where the e-mail relay device 1 and the e-mail server are configured to be logically integrated with each other, the e-mail receiving unit 10 acquires an e-mail to be delivered addressed to the own device (e-mail server) and transmitted from another e-mail server or a transmission source mailer before the e-mail is stored in the e-mail box (transmission destination) corresponding to the destination e-mail address.

In a case where the e-mail relay device 1 and the e-mail server are configured to be logically disconnected from each other, for example, a function of transmitting the received e-mail to be delivered to the predetermined e-mail relay device 1 before the e-mail is stored in the e-mail box may be provided in advance to the e-mail server. A communication unit used upon transmission is not particularly limited. In this case, the address of the e-mail relay device 1 may be registered in the e-mail server in advance as the transmission destination of the received e-mail to be delivered.

After the e-mail receiving unit 10 acquires the e-mail to be delivered, the request notification unit 20 transmits a notification e-mail for allowing communication with a predetermined authentication server over IP, using the transmission source e-mail address of the e-mail to be delivered as a destination. Meanwhile, in the communication with the predetermined authentication server, only the IP address of the transmission source is required to be written in the IP header of an IP packet, and protocols of other layers are not particularly limited. For example, HTTP or HTTPS can be adopted on the upper layer.

In the request notification unit 20, an e-mail address written under the item "envelope from" or the item "from" of the header can be set to the destination of the notification e-mail. However, considering whether the contents thereof are rewritable, or the like, it is preferable that the e-mail address written under the item "envelope from" is set to the destination.

The request notification unit 20 may perform a process of transmitting a notification e-mail with respect to all the e-mails to be delivered which are received by the e-mail receiving unit 10, and may perform a process of transmitting a notification e-mail with respect to only an e-mail to be delivered which satisfies a predetermined condition. The latter example will be described in the following exemplary embodiment.

The notification e-mail contains address information (for example, URL (hereinafter, "authentication URL")) of a predetermined authentication server, and a message for requesting access to the authentication server, for example, in the e-mail text. FIG. 3 shows an example of the notification e-mail. The notification e-mail of FIG. 3 contains the authentication URL. Each authentication URL contained in each of a plurality of notification e-mails is associated with each e-mail to be delivered. That is, there is a correspondence relation between one authentication URL and one e-mail to be delivered.

The authentication server is, for example, a Web server. The authentication server is disposed at a predetermined location (for example, demilitarized zone (DMZ)) on the Internet.

The authentication server may be configured to be physically and/or logically disconnected from the e-mail relay device 1, or may be configured to be physically and/or logically integrated with the e-mail relay device 1. In a case where the e-mail relay device 1 and the authentication server are configured to be physically and/or logically disconnected from each other, these devices are configured to communicate with each other using any communication unit, and to be capable of transmission and reception of data with each other.

Referring back to FIG. 2, in a case where the request notification unit 20 transmits the notification e-mail and then the transmission source terminal communicates with a predetermined authentication server, the transmission source IP address acquisition unit 30 acquires the IP address of the transmission source terminal contained in the IP header of an IP packet transmitted/received during the communication.

The transmission source IP address acquisition unit 30 can acquire the IP address of the transmission source terminal from the authentication server. When there is access from the transmission source terminal to a predetermined URL, the authentication server extracts the IP address of the transmission source terminal from the IP header of the IP packet received from the transmission source terminal during the communication. The extracted IP address is associated with information capable of identifying the accessed URL (authentication URL), and is passed to the transmission source IP address acquisition unit 30.

The determination unit 40 determines the reliability of the e-mail to be delivered based on the IP address of the transmission source terminal. The determination unit 40 determines the reliability of the transmission source terminal, the transmission source user, or the like based on the IP address of the transmission source terminal, and sets the determination result thereof as the determination result of the reliability of the e-mail to be delivered. When the determination result of the transmission source terminal, the transmission source user, or the like is unreliable, the e-mail to be delivered is determined as being unreliable. When the determination result of the transmission source terminal, the transmission source user or the like is reliable, the e-mail to be delivered is determined as being reliable.

For example, a whitelist having the IP addresses of the reliable transmission source terminals listed therein or a blacklist having the IP addresses of the unreliable transmission source terminals listed therein, and the IP addresses of the transmission source terminals acquired by the transmission source IP address acquisition unit 30 may be collated with each other to determine the reliability of the e-mail to be delivered based on the collation result. The address may be determined to be unreliable in a case of being included in the blacklist, and if not, the address may be determined to be reliable. Besides, the address may be determined to be reliable in a case of being included in the whitelist, and if not, the address may be determined to be unreliable. In addition, the determination unit 40 may determine the reliability of the e-mail to be delivered, using other methods based on the IP address of the transmission source terminal. In the following exemplary embodiment, other methods will be described.

In addition, in a case where there is no access to a predetermined authentication server within a predetermined time from the transmission of the notification e-mail, the determination unit 40 may determine that the e-mail to be delivered is unreliable. For example, the request notification unit 20 may transmit a notification e-mail, and then pass information allowing to identify a transmission time and an authentication URL contained in the notification e-mail to the determination unit 40. In a case where an elapsed time from a notification e-mail transmission time is monitored and there is no access to the predetermined authentication URL within a predetermined time (for example, in case where the transmission source IP address acquisition unit 30 is not able to acquire the IP address of the transmission source terminal), the determination unit 40 may determine that the e-mail to be delivered corresponding to the authentication URL is unreliable.

The e-mail relay device 1 can execute a predetermined process with respect to the e-mail to be delivered which is received by the e-mail receiving unit 10 based on the determination result of the determination unit 40.

For example, the e-mail relay device 1 can deliver the e-mail to be delivered determined to be reliable by the determination unit 40, as it is, to the transmission destination. Meanwhile, the e-mail relay device 1 may give information (determination result), indicating a reliable e-mail to be delivered, to the e-mail to be delivered which is determined to be reliable, and then deliver the information to the transmission destination.

On the other hand, the e-mail relay device 1 may discard the e-mail to be delivered which is determined to be unreliable by the determination unit 40 without sending the e-mail to the transmission destination. Alternatively, the e-mail relay device 1 may give predetermined information (such as, for example, information (determination result) indicating a warning and an unreliable e-mail to be delivered) to the e-mail to be delivered which is determined to be unreliable, and then deliver the information to the transmission destination.

According to the present exemplary embodiment described above, the e-mail relay device 1 can acquire the IP address of the transmission source terminal before the e-mail to be delivered reaches the transmission destination. The e-mail relay device 1 can determine the reliability of the e-mail to be delivered based on the acquired IP address of the transmission source terminal. It is possible to perform an appropriate process on the e-mail to be delivered based on the determination result.

In this manner, according to the present exemplary embodiment, it is possible to determine the reliability of the e-mail to be delivered based on the IP address of the transmission source terminal. Therefore, it is possible to determine the reliability of the e-mail to be delivered more accurately than in the related art.

Meanwhile, in the above example, the authentication URL contained in the notification e-mail and the e-mail to be delivered are associated with each other, and the information for identifying the accessed authentication URL and the IP address of the transmission source terminal are associated with each other. Thereby, the e-mail to be delivered and the IP address of the transmission source terminal are associated with each other.

However, a unit that associates the e-mail to be delivered with the IP address of the transmission source terminal is not limited thereto. For example, when the notification e-mails are transmitted, any information for authentication (for example, character string or digit string) may be generated and transmitted inclusive of each notification e-mail. The information for authentication and the e-mail to be delivered may be associated with each other. In addition, during access to the authentication URL, a Web page for receiving the input and transmission of the information for authentication may be returned to the transmission source terminal, and the transmission of the information for authentication may be received. Using such communication, the authentication server can acquire the IP address of the transmission source terminal and the information for authentication in association with each other. As a result, the e-mail to be delivered and the IP address of the transmission source terminal can be associated with each other through the information for authentication.

Second Exemplary Embodiment

An e-mail relay device 1 of the present exemplary embodiment is different from that in the first exemplary embodiment in the configuration of the determination unit 40. Other configurations are the same as those of the e-mail relay device 1 of the first exemplary embodiment.

As is the case with the first exemplary embodiment, FIG. 2 shows an example of a functional block diagram of the e-mail relay device 1 of the present exemplary embodiment. The configurations of the e-mail receiving unit 10, the request notification unit 20, and the transmission source IP address acquisition unit are the same as those of the first exemplary embodiment.

Figure 4:
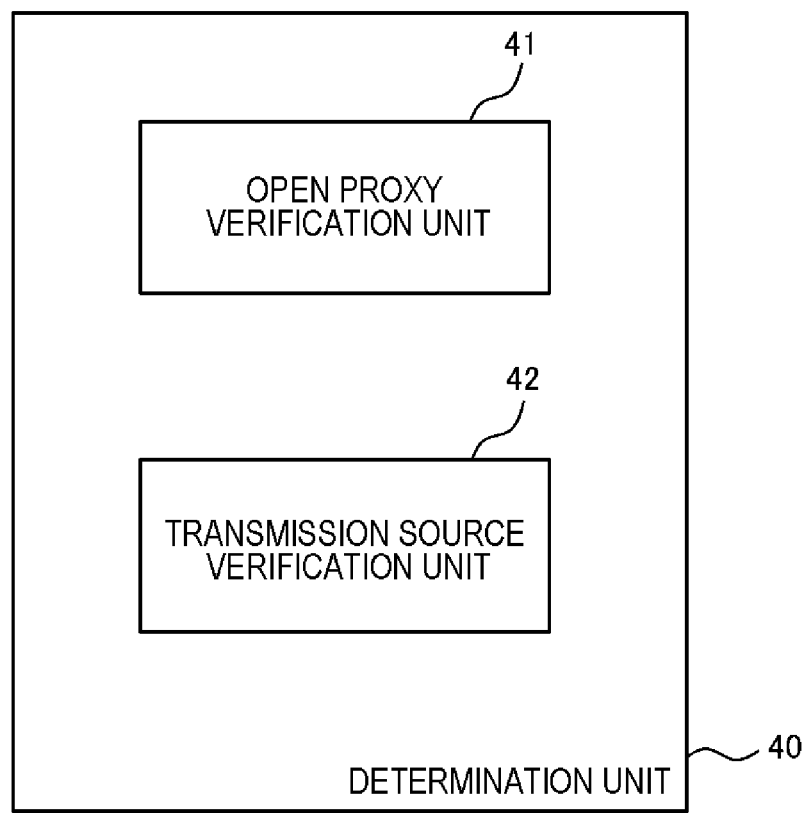
FIG. 4 is an example of a functional block diagram of a determination unit of the present exemplary embodiment.

FIG. 4 shows an example of a functional block diagram of the determination unit 40. As shown in FIG. 4, the determination unit 40 includes an open proxy verification unit 41 and a transmission source verification unit 42. Meanwhile, the determination unit 40 does not need to include any one of the open proxy verification unit 41 and the transmission source verification unit 42.

The open proxy verification unit 41 checks whether or not the IP address of the transmission source terminal is the IP address of an open proxy server. If the address is an IP address of an open proxy server, the e-mail to be delivered is determined to be unreliable. If the address is not an IP address of an open proxy server, the e-mail to be delivered may be determined to be reliable. Further, the e-mail to be delivered may be determined to be reliable in a case where another condition is satisfied.

As another example, in a case where the IP address of the transmission source terminal is an IP address of an open proxy server, the open proxy verification unit 41 may return a request for communication with a predetermined authentication server to the transmission source terminal without going through an open proxy server. Address information (for example, authentication URL) of the predetermined authentication server may be contained in the request. In a case where communication bypassing an open proxy server is not performed within a predetermined time from the request, the e-mail to be delivered may be determined to be unreliable.

Figure 5:
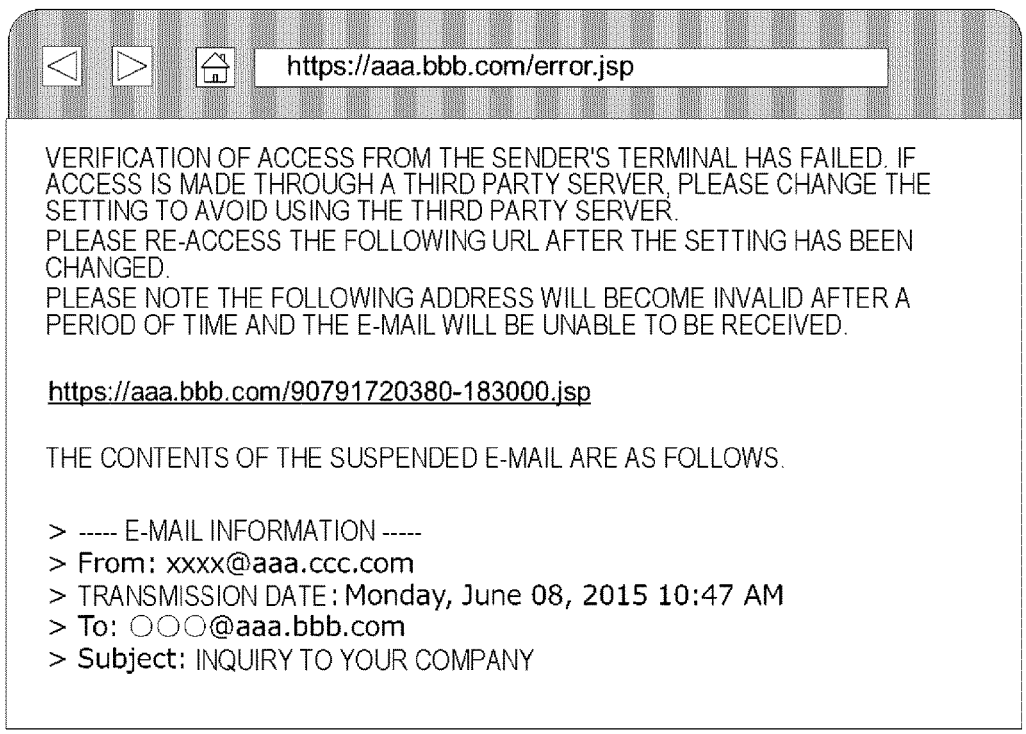
FIG. 5 is a diagram illustrating an example of a request which is returned to a transmission source terminal by the e-mail relay device of the present exemplary embodiment.
Figure 6:
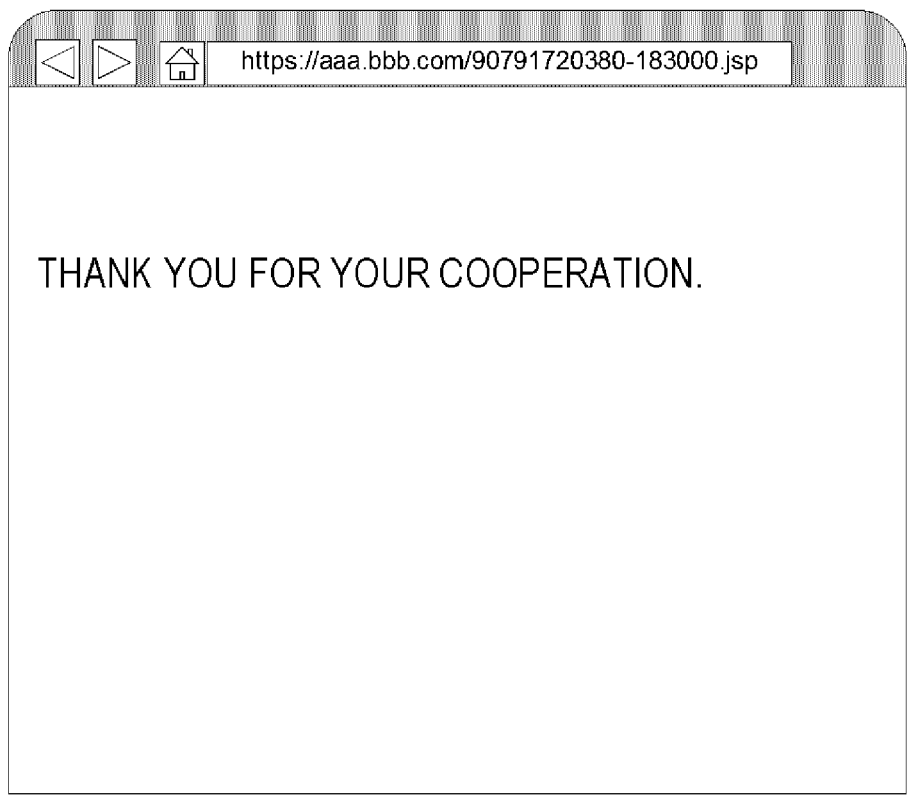
FIG. 6 is a diagram illustrating an example of a Web page which is returned to the transmission source terminal by the e-mail relay device of the present exemplary embodiment.

FIG. 5 shows an example of the request which is returned to the transmission source terminal by the open proxy verification unit 41. The request is returned as a Web page. FIG. 6 shows an example of a Web page which is returned to the transmission source terminal in a case where access bypassing the open proxy server is confirmed.

The open proxy verification unit 41 may determine whether the IP address of the transmission source terminal is an IP address of an open proxy server by acquiring a list of the IP addresses of the open proxy servers from an external server or the like, and collating the IP address of the transmission source terminal with the list. Besides, the determination may be made by checking whether a separate network can actually be accessed through the IP address of the transmission source terminal.

Meanwhile, the open proxy verification unit 41 may further determine whether or not the open proxy server is contained in the e-mail server through which the e-mail to be delivered has passed.

Referring back to FIG. 4, the transmission source verification unit 42 acquires information relating to at least one of the IP address of the transmission source terminal, the IP address of the transmission source e-mail server, and the domain of the transmission source e-mail address of the e-mail to be delivered, from an external server, and determines the reliability of the e-mail to be delivered based on the acquired information. For example, the transmission source verification unit 42 may perform a so-called WHOIS lookup and an IP reputation lookup. Meanwhile, the transmission source verification unit 42 may determine the reliability of the e-mail to be delivered by combining pieces of information relating to each of these lookups. A plurality of pieces of information are combined, thereby allowing a firmer determination to be made.

The external server holds detailed information and evaluation results relating to each of a plurality of IP addresses, detailed information and evaluation results relating to each domain, and the like, and provides the detailed information and evaluation results in accordance with a request from a client.

The transmission source verification unit 42 transmits the IP address of the transmission source terminal, the IP address of the transmission source e-mail server, the domain of the transmission source e-mail address of the e-mail to be delivered, and the like, to the external server, and acquires information relating thereto. The transmission source verification unit 42 determines the reliability of the e-mail to be delivered based on the acquired information.

A determination method or a determination criterion based on the acquired information is the option of design. For example, collation with the blacklist or the whitelist may be performed based on predetermined information acquired by the WHOIS lookup. In a case of being on the blacklist, the e-mail to be delivered may be determined to be unreliable. In addition, in a case of being on the whitelist, the e-mail to be delivered may be determined to be reliable. FIG. 15 schematically shows an example of information acquired by the WHOIS lookup. Besides, the reliability of the e-mail to be delivered may be determined by the determination of a predetermined criterion based on evaluation values acquired by the IP reputation lookup.

According to the present exemplary embodiment described above, it is possible to achieve operational effects similar to those in the first exemplary embodiment.

In addition, according to the present exemplary embodiment, it is possible to reduce the occurrence of an inconvenience that the IP address of the transmission source terminal is not able to be acquired due to an identity theft by an open proxy server. Therefore, it is possible to increase the accuracy of the reliability determination of the e-mail to be delivered based on the IP address of the transmission source terminal.

In addition, according to the present exemplary embodiment, it is possible to acquire, from the external server, information relating to at least one of the IP address of the transmission source terminal, the IP address of the transmission source e-mail server, and the domain of the transmission source e-mail address of the e-mail to be delivered, and to determine the reliability of the e-mail to be delivered based on the information. Particularly, since a determination can be performed using the IP address of the transmission source terminal which could not be used during an e-mail check of the related art, it is possible to increase the accuracy of the reliability determination of the e-mail to be delivered.

Third Exemplary Embodiment

An e-mail relay device 1 of the present exemplary embodiment is different from those in the first and second exemplary embodiments in that a process of transmitting a notification e-mail is performed only on an e-mail to be delivered which satisfies a predetermined condition. Other configurations are the same as those of the first and second exemplary embodiments.

Figure 7:
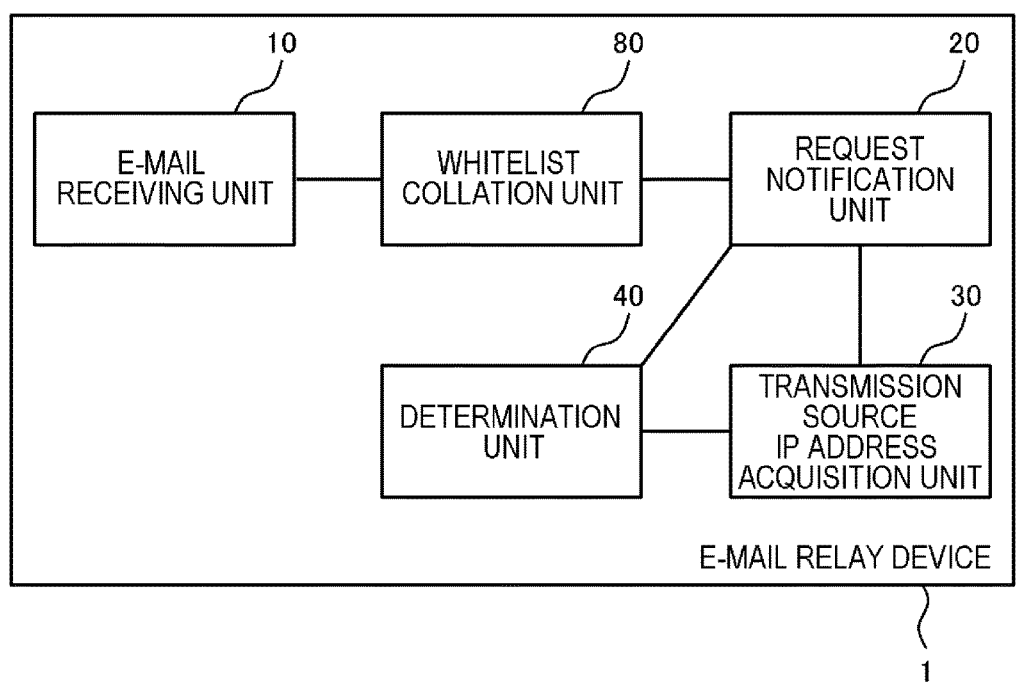
FIG. 7 is an example of a functional block diagram of the e-mail relay device of the present exemplary embodiment.

FIG. 7 shows an example of a functional block diagram of the e-mail relay device 1 of the present exemplary embodiment. As shown in FIG. 7, the e-mail relay device 1 includes an e-mail receiving unit 10, a request notification unit 20, a transmission source IP address acquisition unit 30, a determination unit 40, and a whitelist collation unit 80. The configurations of the e-mail receiving unit 10 and the transmission source IP address acquisition unit 30 are the same as those in the first and second exemplary embodiments.

The whitelist collation unit 80 checks whether or not the transmission source e-mail address of the e-mail to be delivered and/or the IP address of the transmission source e-mail server is contained in the whitelist. The transmission source e-mail address is an e-mail address written under the item "envelope from" or the item "from" of the header. However, considering whether the contents thereof are rewritable, or the like, it is preferable to adopt the e-mail address written under the item "envelope from". FIG. 8 schematically shows an example of the whitelist. In the shown example, the IP addresses of the transmission source e-mail servers and the transmission source e-mail addresses confirmed to be reliable are listed.

The whitelist collation unit 80 may collate only one of the transmission source e-mail address of the e-mail to be delivered and the IP address of the transmission source e-mail server with the whitelist, and may collate the both with the whitelist.

In a case where the whitelist collation unit 80 determines that the address is not contained in the whitelist, the request notification unit 20 transmits a notification e-mail. In a case where the whitelist collation unit 80 determines that the address is contained in the whitelist, the request notification unit 20 does not transmit a notification e-mail.

In a case where the whitelist collation unit 80 collates both the transmission source e-mail address of the e-mail to be delivered and the IP address of the transmission source e-mail server with the whitelist, the request notification unit 20 may not transmit a notification e-mail when any one of the addresses is contained in the whitelist, and may transmit a notification e-mail in other cases. Alternatively, the request notification unit 20 may not transmit a notification e-mail when the both are contained in the whitelist, and may transmit a notification e-mail in other cases.

In a case where the request notification unit 20 does not transmit the notification e-mail, the e-mail relay device 1 may deliver the e-mail to be delivered, as it is, to the transmission destination, or may give the determination result of "reliable" to the e-mail, and then deliver the e-mail to the transmission destination. In a case where the request notification unit 20 transmits the notification e-mail, the e-mail relay device 1 performs the same process as those in the first and second exemplary embodiments.

Meanwhile, the determination unit 40 may add the transmission source e-mail address of the mail to be delivered or the IP address of the transmission source e-mail server, determined to be reliable by the open proxy verification unit 41 or the transmission source verification unit 42, to the whitelist. Meanwhile, a user may edit (such as add, delete, or change) the whitelist.

Other configurations of the request notification unit 20 and the determination unit 40 are the same as those in the first and second exemplary embodiments.

According to the present exemplary embodiment described above, it is possible to achieve the same operational effect as those in the first and second exemplary embodiments.

In addition, instead of transmitting the notification e-mail to all the transmission source users, and causing the users to perform communication with a predetermined authentication server, the notification e-mail may be transmitted only to transmission source users who could not be confirmed as reliable by the whitelist, and have only those users communicate with a predetermined authentication server. As a result, it is possible to reduce the inconvenience for a reliable transmission source user who is irrelevant to the transmission of spam e-mail or the like of performing a troublesome task of communicating with a predetermined authentication server to.

Fourth Exemplary Embodiment

An e-mail relay device 1 of the present exemplary embodiment is different from those in the first and second exemplary embodiments, in that a process of transmitting a notification e-mail is performed only on an e-mail to be delivered which satisfies a predetermined condition. Other configurations are the same as those in the first and second exemplary embodiments. Meanwhile, the predetermined condition of the present exemplary embodiment is different from the predetermined condition of third exemplary embodiment.

Figure 9:
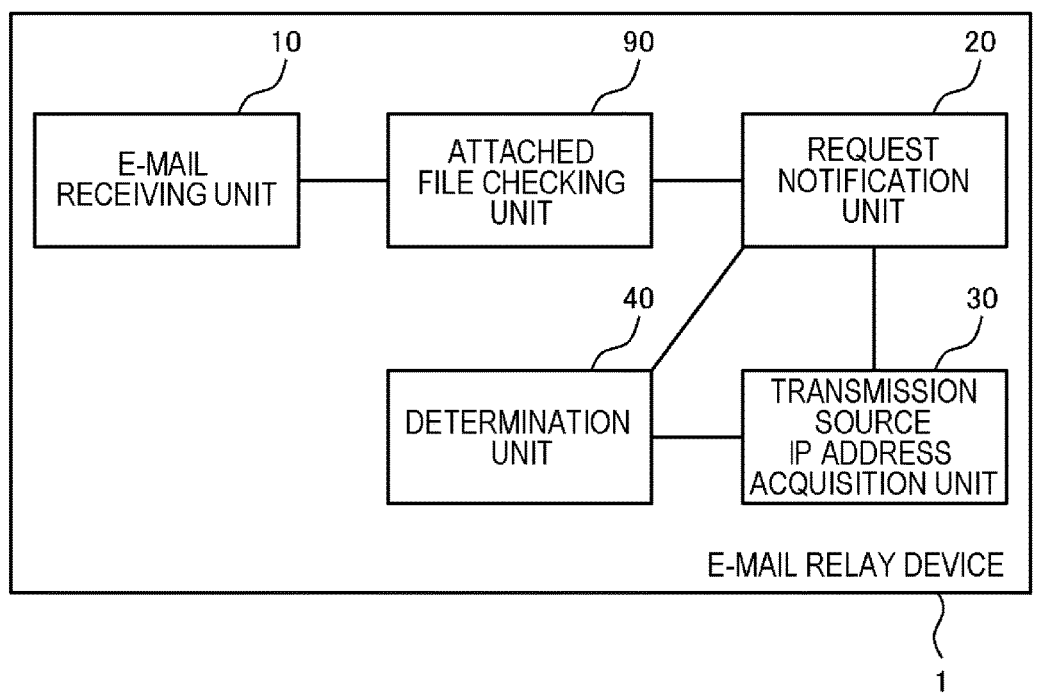
FIG. 9 is an example of a functional block diagram of the e-mail relay device of the present exemplary embodiment.

FIG. 9 shows an example of a functional block diagram of the e-mail relay device 1 of the present exemplary embodiment. As shown in FIG. 9, the e-mail relay device 1 includes an e-mail receiving unit 10, a request notification unit 20, a transmission source IP address acquisition unit 30, a determination unit 40, and an attached file checking unit 90. Meanwhile, although not shown in the drawing, the e-mail relay device 1 may further include a whitelist collation unit 80. The configurations of the e-mail receiving unit 10, the transmission source IP address acquisition unit 30, and the whitelist collation unit 80 are the same as those in the first to third exemplary embodiments.

The attached file checking unit 90 determines whether an e-mail to be delivered is attached with a file.

In a case where the attached file checking unit 90 determines that a file is attached, the request notification unit 20 transmits a notification e-mail. In a case where the attached file checking unit 90 determines that no file is attached, the request notification unit 20 does not transmit the notification e-mail.

Meanwhile, in a case where the e-mail relay device 1 includes the whitelist collation unit 80, the request notification unit 20 may transmit the notification e-mail in a case where the whitelist collation unit 80 determines that the address is not contained in the whitelist and the attached file checking unit 90 determines that a file is attached to the e-mail. The request notification unit 20 does not need to transmit the notification e-mail in other cases.

In a case where the request notification unit 20 does not transmit the notification e-mail, the e-mail relay device 1 can deliver the e-mail to be delivered, as it is, to the transmission destination. In a case where the request notification unit 20 transmits the notification e-mail, the e-mail relay device 1 performs the same process as those in the first and second exemplary embodiments.

Other configurations of the request notification unit 20 and the determination unit 40 are the same as those in the first and second exemplary embodiments.

According to the present exemplary embodiment described above, it is possible to achieve the same operational effect as those in the first to third exemplary embodiments.

In addition, instead of transmitting the notification e-mail to all the transmission source users, and causing the users to perform communication with a predetermined authentication server, the notification e-mail may be transmitted only to transmission source users appending a file, and have only those users perform communication with a predetermined authentication server.

Alternatively, the notification e-mail may be transmitted only to the transmission source users who could not be confirmed as reliable by the whitelist and appending a file, and have only those users perform communication with the predetermined authentication server.

In a case of the present exemplary embodiment allowing to classify e-mails depending on whether or not the e-mail is an e-mail to be delivered with an attached file, it is possible to effectively suppress virus infection caused by the attached file. In addition, it is possible to reduce the inconvenience of a transmission source user who has not appended any file of performing a troublesome task of communicating with a predetermined server, or the like.

Fifth Exemplary Embodiment

An e-mail relay device 1 of the present exemplary embodiment is different from those in the first to fourth exemplary embodiments, in that an e-mail to be delivered having predetermined information appended thereto is delivered. Other configurations are the same as those in the first to fourth exemplary embodiments.

Figure 10:
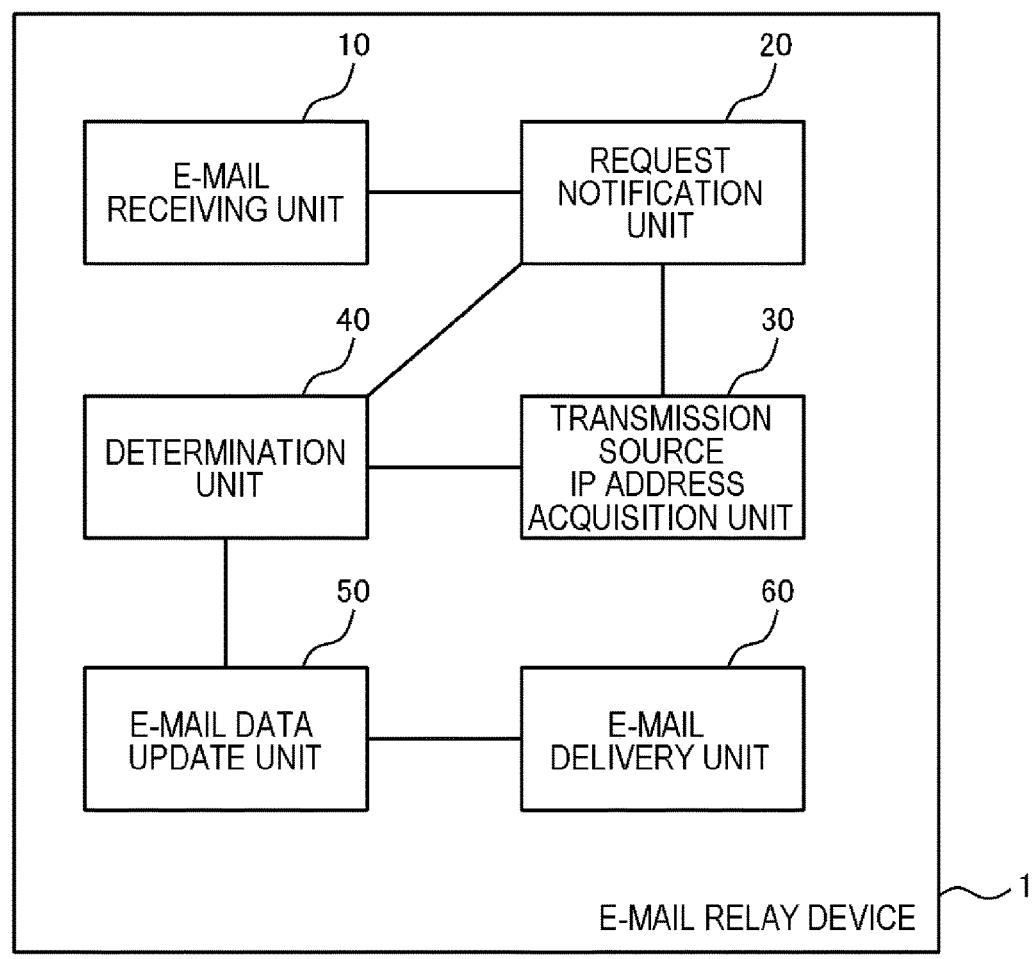
FIG. 10 is an example of a functional block diagram of the e-mail relay device of the present exemplary embodiment.

FIG. 10 shows an example of a functional block diagram of the e-mail relay device 1 of the present exemplary embodiment. As shown in FIG. 10, the e-mail relay device 1 includes an e-mail receiving unit 10, a request notification unit 20, a transmission source IP address acquisition unit 30, a determination unit 40, an e-mail data update unit 50, and an e-mail delivery unit 60. Meanwhile, although not shown in the drawing, the e-mail relay device 1 may further include at least one of a whitelist collation unit 80 and an attached file checking unit 90.

The configurations of the e-mail receiving unit 10, the request notification unit 20, the transmission source IP address acquisition unit 30, the determination unit 40, the whitelist collation unit 80 and the attached file checking unit 90 are the same as those in the first to fourth exemplary embodiments.

The e-mail data update unit 50 appends predetermined information to the e-mail to be delivered, and updates e-mail data.

As an example, the e-mail data update unit 50 attaches a determination result of the determination unit 40 to the e-mail to be delivered. For example, the e-mail data update unit 50 attaches a determination result of whether the e-mail to be delivered is reliable, or information (information relating to the IP address of the transmission source terminal) acquired by the WHOIS lookup, the IP reputation lookup and the like, to the e-mail to be delivered.

Meanwhile, in a case where the request notification unit 20 does not transmit the notification e-mail, the determination by the determination unit 40 is not performed. In this case, the e-mail data update unit 50 does not need to attach any information to the e-mail to be delivered, or may attach information indicating that the e-mail to be delivered is reliable.

Besides, the e-mail data update unit 50 may add the determination result of the whitelist collation unit 80, the IP address of the transmission source terminal acquired by the transmission source IP address acquisition unit 30, or the like, to the e-mail to be delivered.

The e-mail data update unit 50 can attach the information to the e-mail to be delivered so that an e-mail recipient (user) can visually recognize the information. For example, the information may be added to the e-mail text, the e-mail header or the like so as to be discriminable from information from the transmission source user.

The e-mail delivery unit 60 delivers the e-mail to be delivered having the predetermined information (such as determination result of the determination unit 40) appended thereto by the e-mail data update unit 50, to the transmission destination. The e-mail delivery unit 60 transmits the e-mail to be delivered, for example, to an external e-mail server or a predetermined e-mail box within the device (e-mail server), and the e-mail may be transmitted using SMTP in either case. As a result of delivery, the e-mail to be delivered is stored in a predetermined e-mail box (transmission destination) of the transmission destination e-mail server, and becomes acquirable through a mailer by an e-mail recipient (user).

According to the present exemplary embodiment described above, it is possible to achieve the same operational effect as those in the first to fourth exemplary embodiments.

In addition, according to the present exemplary embodiment, it is possible to deliver the e-mail to be delivered to the transmission destination while attaching information such as a determination result of the determination unit 40. As a result, it is possible to issue a warning to a user who has received the e-mail to be delivered, or to provide information for a user to determine the reliability of the e-mail to be delivered.

Sixth Exemplary Embodiment

An e-mail relay device 1 of the present exemplary embodiment is different from those in the first to fifth exemplary embodiments, in that an e-mail to be delivered that satisfies a predetermined condition is discarded without being transmitted to the transmission destination. Other configurations are the same as those in the first to fifth exemplary embodiments.

Figure 11:
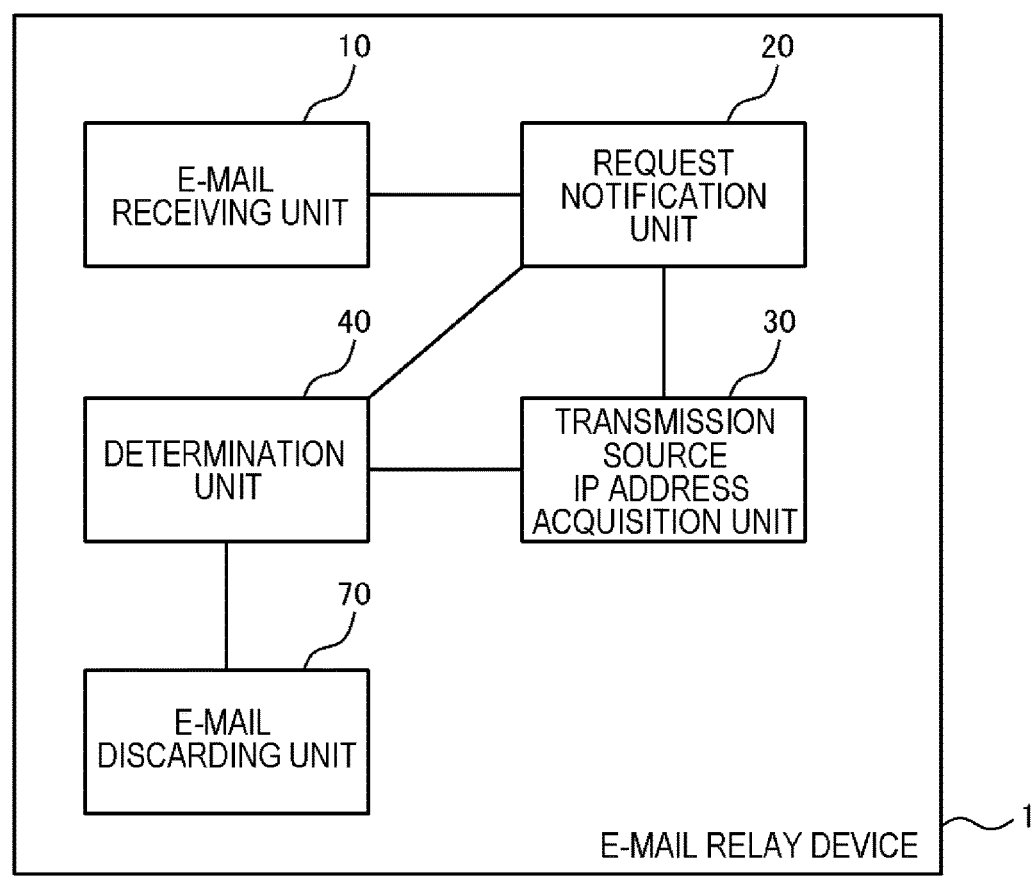
FIG. 11 is an example of a functional block diagram of the e-mail relay device of the present exemplary embodiment.

FIG. 11 shows an example of a functional block diagram of the e-mail relay device 1 of the present exemplary embodiment. As shown in FIG. 11, the e-mail relay device 1 includes an e-mail receiving unit 10, a request notification unit 20, a transmission source IP address acquisition unit 30, a determination unit 40, and an e-mail discarding unit 70. Meanwhile, although not shown in the drawing, the e-mail relay device 1 may further include at least one of an e-mail data update unit 50, an e-mail delivery unit 60, a whitelist collation unit 80 and an attached file checking unit 90.

The configuration of the e-mail receiving unit 10, the request notification unit 20, the transmission source IP address acquisition unit 30, the determination unit 40, the whitelist collation unit 80 and the attached file checking unit 90 are the same as those in the first to fifth exemplary embodiments.

The e-mail discarding unit 70 discards the e-mail to be delivered that satisfies a predetermined condition without transmitting the e-mail to the transmission destination.

For example, in a case where it is determined by the determination unit 40 that the e-mail to be delivered is unreliable, the e-mail discarding unit 70 discards the e-mail to be delivered, without sending the e-mail to the transmission destination.

Meanwhile, in some cases where it is determined by the determination unit 40 that the e-mail to be delivered is unreliable, the e-mail discarding unit 70 may discard the e-mail to be delivered. In other cases, the e-mail data update unit 50 may append predetermined information to the e-mail to be delivered, and the e-mail delivery unit 60 may deliver the e-mail to be delivered.

For example, in a case where there is no access to a predetermined authentication server (for example, authentication URL) within a predetermined time from the transmission of the notification e-mail, the e-mail discarding unit 70 may discard an e-mail to be delivered, corresponding to the authentication URL, without sending the e-mail to the transmission destination. In addition to or instead of the example, in a case where communication by bypassing an open proxy server is not performed within a predetermined period of time from the time of a request for communication with a predetermined authentication server by bypassing an open proxy server, the e-mail discarding unit 70 may discard an e-mail to be delivered, corresponding to the authentication URL, without sending the e-mail to the transmission destination.

In other cases, the e-mail data update unit 50 may append predetermined information to the e-mail to be delivered, and the e-mail delivery unit 60 may deliver the e-mail to be delivered.

According to the present exemplary embodiment described above, it is possible to achieve the same operational effect as those in the first to fifth exemplary embodiments.

In addition, according to the present exemplary embodiment, it is possible to discard an unreliable e-mail to be delivered without sending the e-mail to the transmission destination. As a result, it is possible to reduce the inconvenience of a user of receiving the unreliable e-mail to be delivered.

In addition, according to the present exemplary embodiment, it is possible to discard an e-mail to be delivered depending on the situation, or to send the e-mail to the transmission destination in a state of having predetermined information appended thereto.

For example, in a case where the IP address of the transmission source terminal is not able to be acquired, and an e-mail to be delivered based on the IP address is not able to be evaluated, the reliability of the e-mail to be delivered can be determined to be extremely low. In such a case, the e-mail discarding unit 70 can discard the e-mail to be delivered. In a case where the IP address of the transmission source terminal is able to be acquired, even if the evaluation result based on the IP address is "unreliable", the IP address can be determined to be more reliable than in a case where the IP address of the transmission source terminal is not able to be acquired. Consequently, in such a case, the e-mail to be delivered may be delivered to the transmission destination by providing information such as a determination result without discarding the e-mail to be delivered.

In this manner, according to the present exemplary embodiment, unreliable e-mails can be discarded or delivered with attached information, flexibly, in accordance with the level of reliability, without uniformly discarding all unreliable e-mails.

Seventh Exemplary Embodiment

Figure 12:
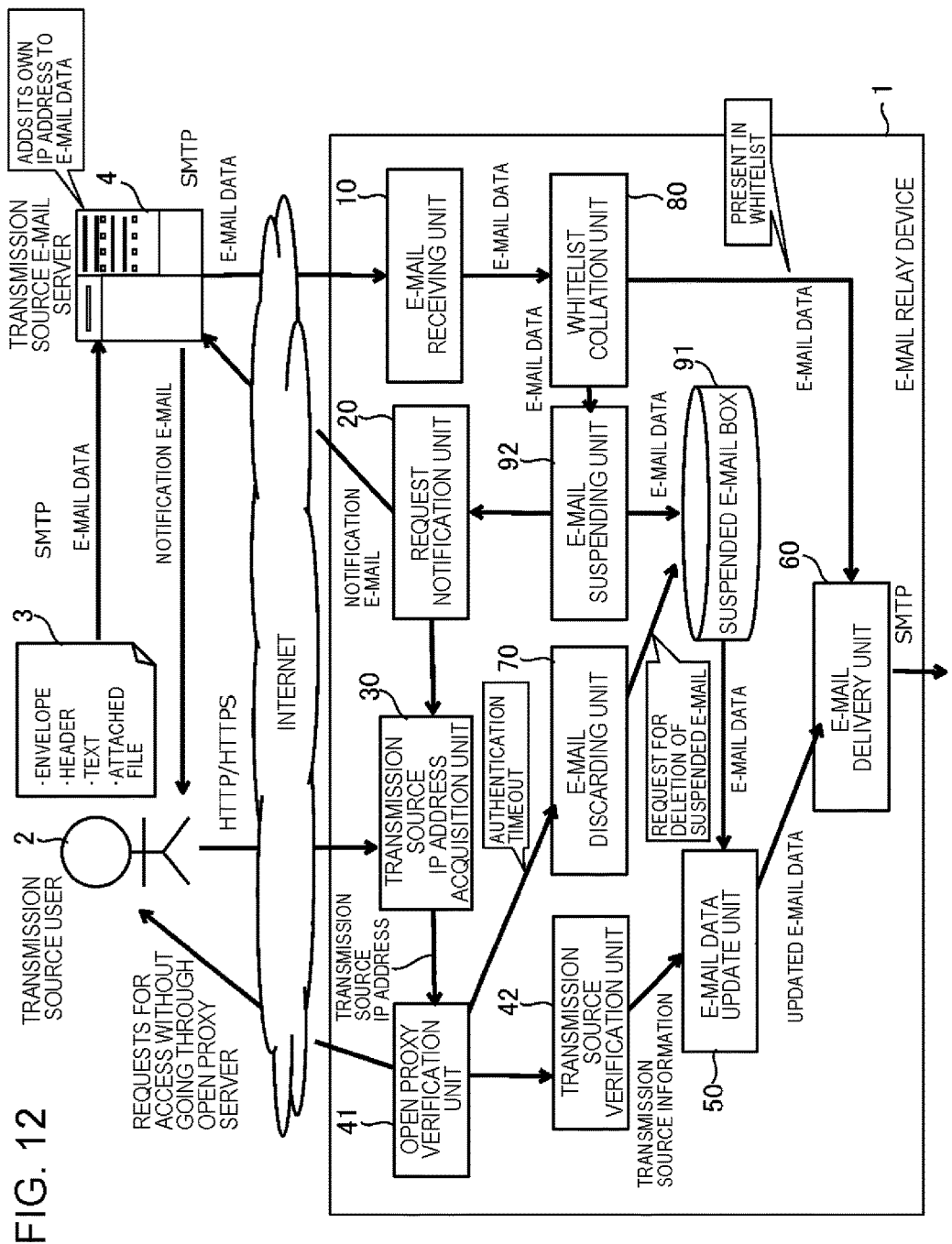
FIG. 12 is an example of a functional block diagram of the e-mail relay device of the present exemplary embodiment.

FIG. 12 shows an example of a functional block diagram of an e-mail relay device 1 of the present exemplary embodiment. As shown in FIG. 12, the e-mail relay device 1 includes an e-mail receiving unit 10, a request notification unit 20, a transmission source IP address acquisition unit 30, an open proxy verification unit 41 (determination unit 40), a transmission source verification unit 42 (determination unit 40), an e-mail data update unit 50, an e-mail delivery unit 60, an e-mail discarding unit 70, a whitelist collation unit 80, a suspended e-mail box 91, and an e-mail suspending unit 92.

The configurations of the e-mail receiving unit 10, the request notification unit 20, the transmission source IP address acquisition unit 30, the open proxy verification unit 41, the transmission source verification unit 42, the e-mail data update unit 50, the e-mail delivery unit 60, the e-mail discarding unit 70, and the whitelist collation unit 80 are the same as those in the first to sixth exemplary embodiments.

The suspended e-mail box 91 stores an e-mail to be delivered. The e-mail suspending unit 92 stores an e-mail to be delivered for which a notification e-mail is to be transmitted by the request notification unit 20, in the suspended e-mail box 91.

Hereinafter, an example of a flow of processes of the e-mail relay device 1 of the present exemplary embodiment will be described with reference to the flow diagram of FIGS. 12, 13 and 14.

First, a transmission source user 2 shown in FIG. 12 executes a transmission source mailer by operating the transmission source terminal, and performs the creation and transmission of e-mail data 3. The e-mail data 3 is transmitted from the transmission source terminal to a transmission source e-mail server 4, using SMTP.

The transmission source e-mail server 4 specifies a transmission destination e-mail server from the domain of a destination e-mail address contained in the received e-mail data 3. The transmission source e-mail server 4 transmits the e-mail data 3 to the specified transmission destination e-mail server, using SMTP.

The e-mail relay device 1 of the present exemplary embodiment is configured to be logically integrated with the e-mail server. Meanwhile, as described above, the e-mail relay device 1 and the e-mail server may be configured to be logically disconnected from each other.

In a case where the e-mail relay device 1 is the transmission destination e-mail server of the e-mail data 3, the transmission source e-mail server 4 transmits the e-mail data 3 to the e-mail relay device (transmission destination e-mail server). The e-mail receiving unit 10 then receives the e-mail data 3 before the data is stored in the transmission destination (S10 in FIG. 13).

Figure 13:
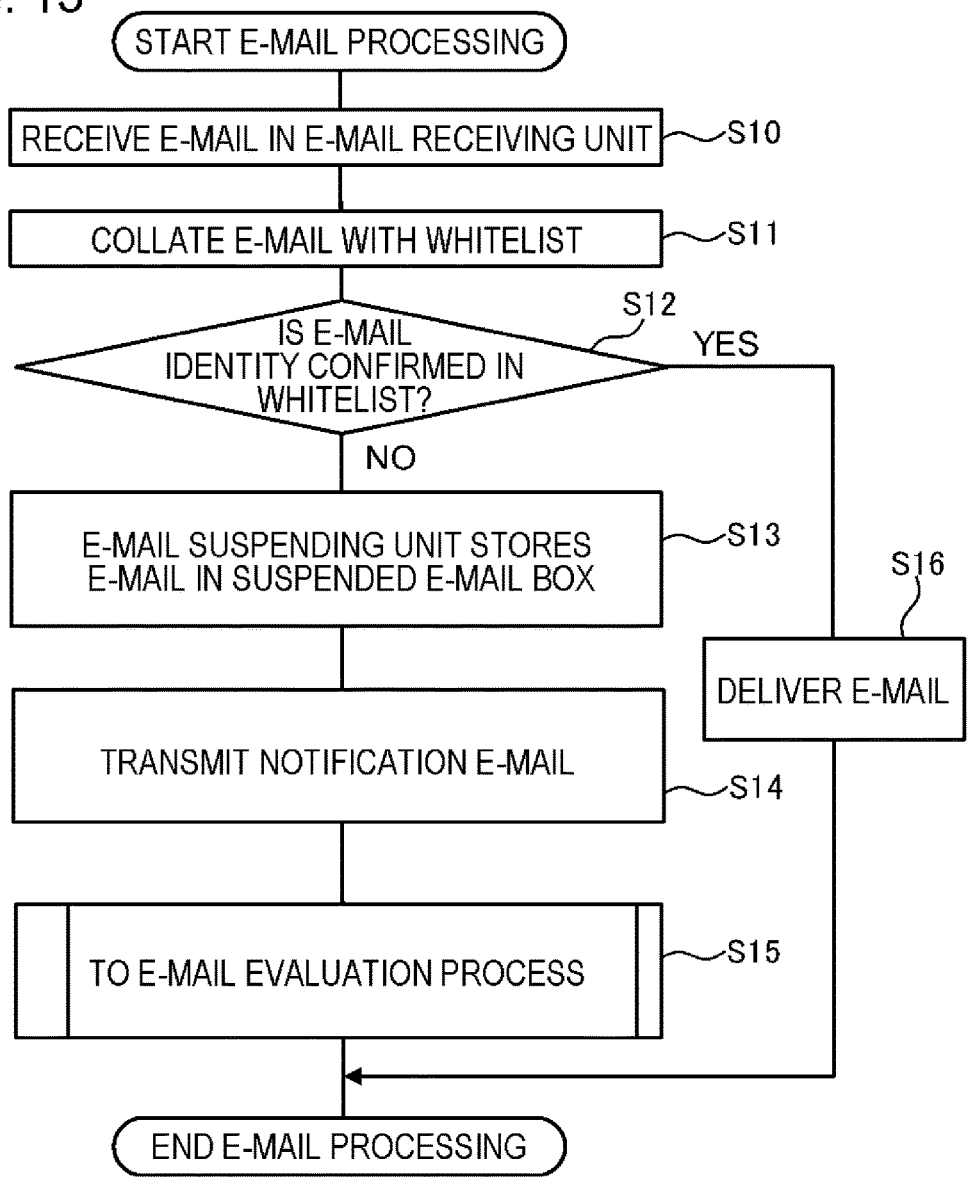
FIG. 13 is a flow diagram illustrating an example of a flow of processes of the e-mail relay device of the present exemplary embodiment.

Thereafter, the whitelist collation unit 80 extracts an e-mail address (transmission source e-mail address) written under the item "envelope from" of the e-mail data 3, and collates the extracted address with a whitelist having reliable e-mail addresses listed therein (S11 in FIG. 13).

In a case where the transmission source e-mail address is contained in the whitelist (Yes of S12 in FIG. 13), the whitelist collation unit 80 passes the e-mail data 3 to the e-mail delivery unit 60. The e-mail delivery unit 60 then delivers the e-mail data 3, as it is, to the transmission destination (S16 in FIG. 13).

On the other hand, in a case where the transmission source e-mail address is not contained in the whitelist (No of S12 in FIG. 13), the whitelist collation unit 80 passes the e-mail data 3 to the e-mail suspending unit 92. The e-mail suspending unit 92 then stores the e-mail data 3 in the suspended e-mail box 91 (S13 in FIG. 13). In addition, the e-mail suspending unit 92 passes information (for example, some or all of the e-mail data 3) for identifying the e-mail data 3 to the request notification unit 20.

Then, the request notification unit 20 generates a Web page and an authentication URL for authenticating a transmission source user, and generates a notification e-mail inclusive of the authentication URL. The request notification unit 20 then transmits the generated notification e-mail (see, for example, FIG. 3), using an e-mail address (transmission source e-mail address) written under the item "envelope from" of the e-mail data 3 as a destination (S14 in FIG. 13). The notification e-mail reaches the transmission source terminal of the transmission source user 2 through the transmission source e-mail server 4. The request notification unit 20 associates the generated authentication URL with the e-mail data 3.

Thereafter, the flow proceeds to an evaluation process of an e-mail to be delivered based on the IP address of the transmission source terminal (S15 in FIG. 13).

When the transmission source user 2 who has checked the notification e-mail operates the transmission source terminal, and executes, for example, a Web browser to access a authentication URL contained in the notification e-mail through HTTP or HTTPS (Yes of S20 in FIG. 14), the transmission source IP address acquisition unit 30 acquires the IP address of the transmission source terminal and the authentication URL from a authentication server, in association with each other.

Figure 14:
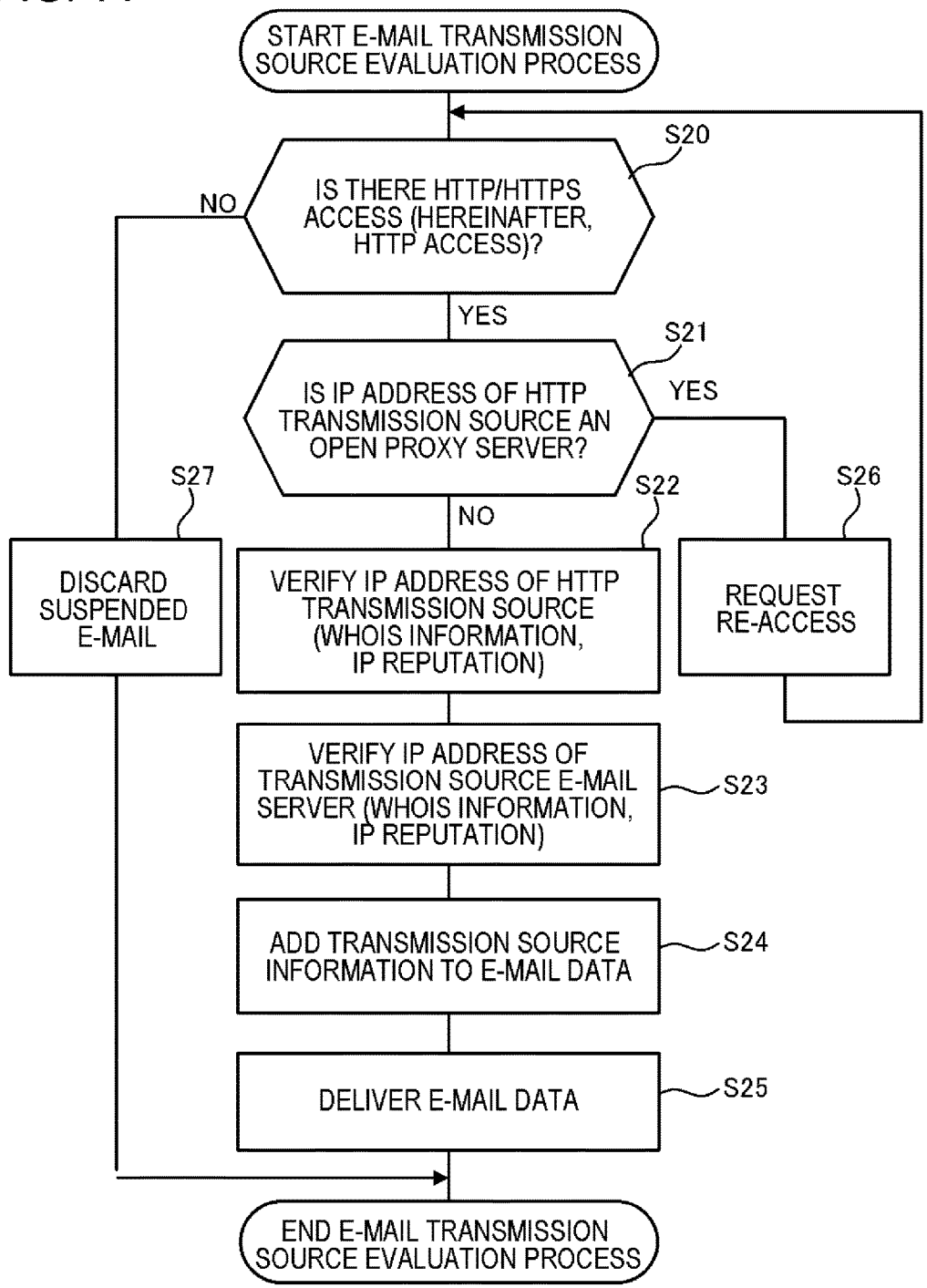
FIG. 14 is a flow diagram illustrating an example of a flow of processes of the e-mail relay device of the present exemplary embodiment.

The open proxy verification unit 41 then checks whether the IP address of the transmission source terminal is an IP address of an open proxy server (S21 in FIG. 14).

In a case where the IP address is an IP address of an open proxy server (Yes of S21 in FIG. 14), the open proxy verification unit 41 transmits a request (see, for example, FIG. 5) for access by bypassing an open proxy server to the transmission source terminal (S26 in FIG. 14).

In a case where there is no access to the authentication server by bypassing an open proxy server within a predetermined time from the transmission of the request of S26 (No of S20), the e-mail discarding unit 70 discards (deletes) the e-mail data 3 corresponding to the authentication URL from the suspended e-mail box 91 (S27 in FIG. 14).

In addition, in a case where there is no access to the authentication server within a predetermined time from the transmission of the notification e-mail (No of S20), the e-mail discarding unit 70 discards (deletes) the e-mail data 3 corresponding to the authentication URL from the suspended e-mail box 91 (S27 in FIG. 14).

On the other hand, in a case where the IP address of the transmission source terminal is not an IP address of an open proxy server (No of S21 in FIG. 14), the transmission source verification unit 42 acquires information relating to the IP address of the transmission source terminal through the WHOIS lookup or the IP reputation lookup, and determines the reliability of the e-mail to be delivered (S22 in FIG. 14).

In addition, the transmission source verification unit 42 acquires information relating to the IP address of the transmission source e-mail server 4 or information relating to the domain of the transmission source e-mail address through the WHOIS lookup or the IP reputation lookup, and determines the reliability of the e-mail to be delivered (S23 in FIG. 14).

Thereafter, the e-mail data update unit 50 adds the determination result (whether the e-mail to be delivered is reliable) of the transmission source verification unit 42, the information acquired for verification by the transmission source verification unit 42, or the like, to the e-mail data 3 extracted from the suspended e-mail box 91 (S24 in FIG. 14). The e-mail delivery unit 60 then delivers the e-mail data 3 updated by the e-mail data update unit 50 to the transmission destination (S25).

According to the present exemplary embodiment described above, it is possible to achieve the same operational effect as those in the first to sixth exemplary embodiments.

Eighth Exemplary Embodiment

Figure 16:
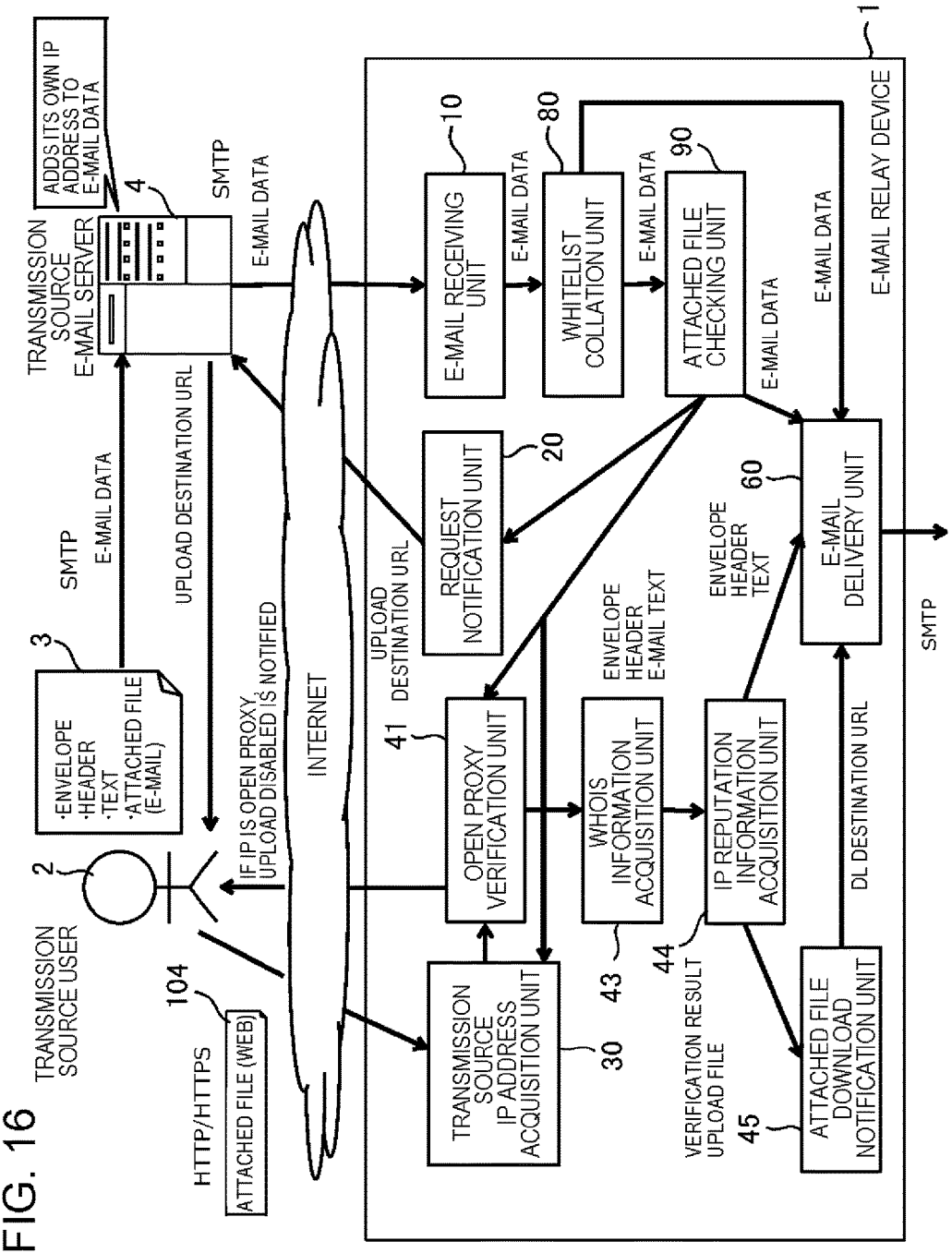
FIG. 16 is an example of a functional block diagram of the e-mail relay device of the present exemplary embodiment.

FIG. 16 shows an example of a functional block diagram of an e-mail relay device 1 of the present exemplary embodiment. As shown in FIG. 16, the e-mail relay device 1 includes an e-mail receiving unit 10, a request notification unit 20, a transmission source IP address acquisition unit 30, an open proxy verification unit 41 (determination unit 40), a WHOIS information acquisition unit 43, an IP reputation information acquisition unit 44, an attached file download notification unit 45, an e-mail delivery unit 60, a whitelist collation unit 80, and an attached file checking unit 90.

The configurations of the e-mail receiving unit 10, the open proxy verification unit 41, the whitelist collation unit 80 and the attached file checking unit are the same as those in the first to seventh exemplary embodiments.

The request notification unit 20 makes a request for uploading a predetermined file (for example, attached file or e-mail to be delivered) to the authentication server, in the notification e-mail. Other configurations of the request notification unit are the same as those in the first to seventh exemplary embodiments.

The WHOIS information acquisition unit 43 performs the WHOIS lookup based on the IP address of the transmission source terminal, the IP address of the transmission source e-mail server 4, the domain of the transmission source e-mail address, and the like, and acquires information relating thereto from an external server.

The IP reputation information acquisition unit 44 performs the IP reputation lookup based on the IP address of the transmission source terminal, the IP address of the transmission source e-mail server 4, the domain of the transmission source e-mail address, and the like, and acquires information relating thereto from the external server.

In a case where an attached file is contained in the e-mail data 3, the attached file download notification unit 45 adds the download destination (for example, URL) of the attached file to the e-mail data 3.

The e-mail delivery unit 60 delivers the e-mail data 3 which does not contain the attached file to the transmission destination. In a case where the attached file is contained in the e-mail data 3 received by the e-mail receiving unit 10, the e-mail delivery unit 60 delivers the e-mail data 3, having the attached file removed therefrom and the download destination of the attached file added thereto, to the transmission destination.

Meanwhile, information of the download destination (for example, URL) of the attached file which is generated by the attached file download notification unit 45 does not need to be added to the e-mail data 3, and may be transmitted to the transmission destination of the e-mail data 3 by another e-mail (notification e-mail).

Hereinafter, an example of a flow of processes of the e-mail relay device 1 of the present exemplary embodiment will be described with reference to the flow diagrams of FIGS. 16 and 17.

First, a transmission source user 2 shown in FIG. 16 executes a transmission source mailer by operating the transmission source terminal, and performs the creation and transmission of e-mail data 3. The e-mail data 3 is transmitted from the transmission source terminal to a transmission source e-mail server 4, using SMTP.

The transmission source e-mail server 4 specifies a transmission destination e-mail server from the domain of a destination e-mail address contained in the received e-mail data 3. The transmission source e-mail server 4 transmits the e-mail data 3 to the specified transmission destination e-mail server, using SMTP.

The e-mail relay device 1 of the present exemplary embodiment is configured to be logically integrated with the e-mail server. Meanwhile, as described above, the e-mail relay device 1 and the e-mail server may be configured to be logically disconnected from each other.

In a case where the e-mail relay device 1 is the transmission destination e-mail server of the e-mail data 3, the transmission source e-mail server 4 transmits the e-mail data 3 to the e-mail relay device (transmission destination e-mail server). The e-mail receiving unit 10 then receives the e-mail data 3 before the data is stored in the transmission destination (S30 in FIG. 17).

Figure 17:
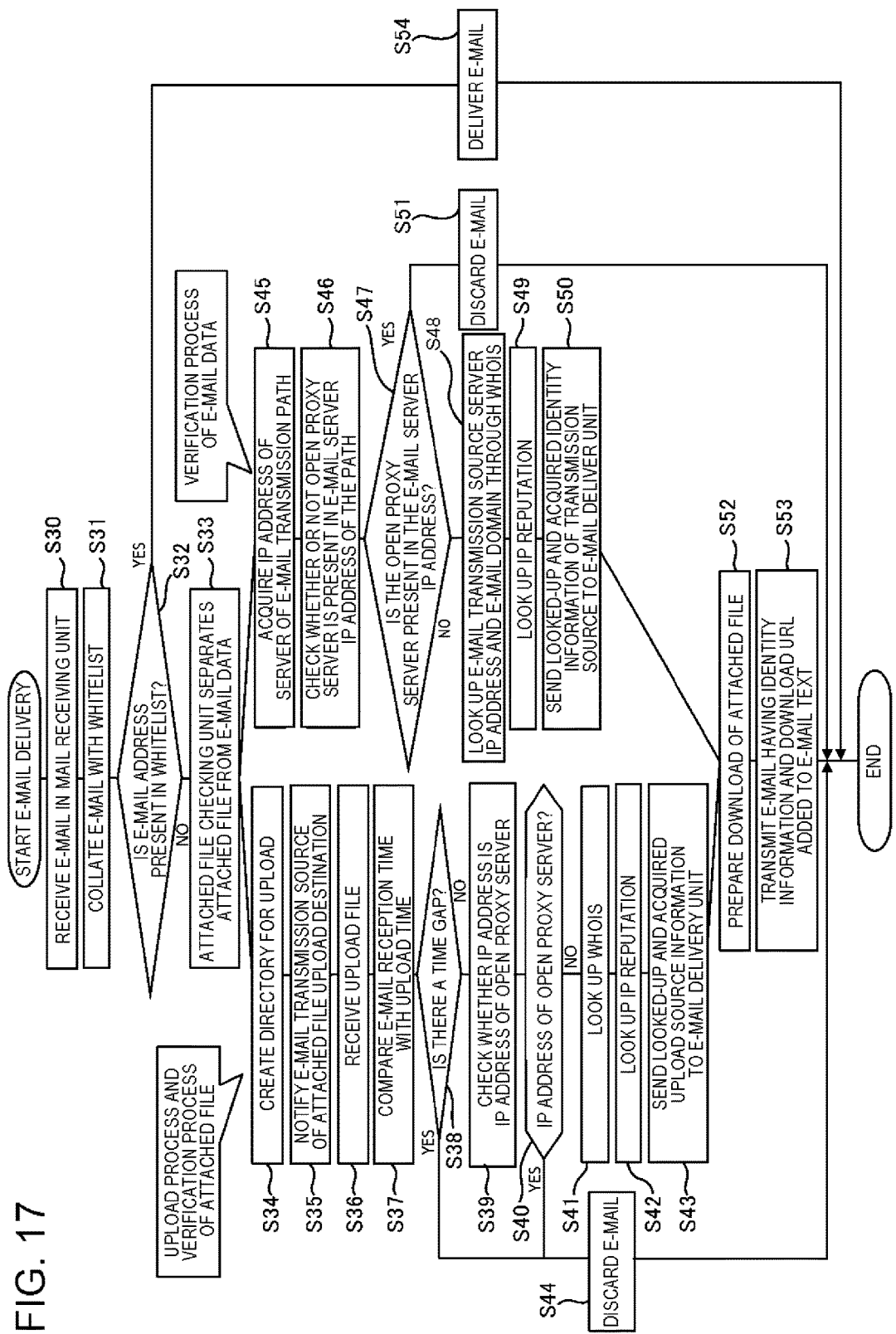
FIG. 17 is a flow diagram illustrating an example of a flow of processes of the e-mail relay device of the present exemplary embodiment.

Thereafter, the whitelist collation unit 80 extracts an e-mail address (transmission source e-mail address) written under the item "envelope from" of the e-mail data 3, and collates the extracted address with a whitelist having reliable e-mail addresses listed therein (S31 in FIG. 17).

In a case where the transmission source e-mail address is contained in the whitelist (Yes of S32 in FIG. 17), the whitelist collation unit 80 passes the e-mail data 3 to the e-mail delivery unit 60. The e-mail delivery unit 60 then delivers the e-mail data 3, as it is, to the transmission destination (S54 in FIG. 17).

On the other hand, in a case where the transmission source e-mail address is not contained in the whitelist (No of S32 in FIG. 17), the whitelist collation unit 80 passes the e-mail data 3 to the attached file checking unit 90. The attached file checking unit 90 then extracts an attached file from the e-mail data 3 (S33 in FIG. 17).

Meanwhile, although not shown in FIG. 17, in a case where an attached file is not present in the e-mail data 3, the attached file checking unit 90 may pass the e-mail data 3, as it is e-mail, to the delivery unit 60. The e-mail delivery unit 60 may deliver the e-mail data 3, as it is, to the transmission destination.

After S33, two processes ("verification process of e-mail data" and, "upload and verification process of an attached file") proceed side by side. First, a verification process of e-mail data will be described.

The attached file checking unit 90 passes some or all of the e-mail data 3 to the open proxy verification unit 41. The open proxy verification unit 41 acquires the IP addresses of servers on a transmission path of the e-mail data 3 (S45 in FIG. 17). The open proxy verification unit 41 then checks whether or not an IP address of an open proxy server is present in the acquired IP addresses (S46 in FIG. 17).

In a case where an IP address of an open proxy server is present (Yes of S47 in FIG. 17), the e-mail data 3 is discarded (S51 in FIG. 17), and the process is terminated. In this case, the upload process and verification process of an attached file are also stopped.

On the other hand, in a case where no IP address of an open proxy server is present (No of S47 in FIG. 17), the WHOIS information acquisition unit 43 acquires information relating to the IP address of the server on the transmission path of the e-mail data 3 and the domain of the transmission source e-mail address, through the WHOIS lookup (S48 in FIG. 17). In addition, the IP reputation information acquisition unit 44 acquires information relating to the IP address of the server on the transmission path of the e-mail data 3 and the domain of the transmission source e-mail address, through the IP reputation lookup (S49 in FIG. 17).

The information acquired in S48 and S49 is passed to the e-mail delivery unit 60 in association with the e-mail data 3 (S50 in FIG. 17).

Next, the upload and verification process of an attached file will be described. The attached file checking unit 90 passes some or all of the e-mail data 3 to the request notification unit 20. Then, the request notification unit 20 creates a directory for attached file upload (S34 in FIG. 17). The request notification unit 20 then generates a notification e-mail inclusive of the upload destination (for example, URL of the directory) of the attached file.

The request notification unit 20 then transmits the generated notification e-mail (see, for example, FIG. 18), using an e-mail address (transmission source e-mail address) written under the item "envelope from" of the e-mail data 3 as a destination (S35 in FIG. 17). The notification e-mail reaches the transmission source terminal of the transmission source user 2 through the transmission source e-mail server 4. The request notification unit 20 associates the URL of the directory with the e-mail data 3.

Thereafter, the transmission source user 2 who has checked the notification e-mail operates the transmission source terminal and executes, for example, a Web browser to upload an attached file through HTTP or HTTPS (S36 in FIG. 17). Then, the transmission source IP address acquisition unit 30 acquires the IP address of the transmission source terminal contained in the IP header of an IP packet transmitted/received during the communication.

Thereafter, the transmission source IP address acquisition unit 30 compares the time of receipt of the e-mail data 3 with the upload time of the attached file (S37 in FIG. 17). In a case where a difference in time is equal to or more than a predetermined time (Yes of S38 in FIG. 17), the e-mail data 3 is discarded (S44 in FIG. 17), and the process is terminated. In this case, the verification process of e-mail data is also stopped.

On the other hand, in a case where a difference in time is less than a predetermined time (No of S38 in FIG. 17), the open proxy verification unit 41 checks whether the IP address of the transmission source terminal is an IP address of an open proxy server (S39 in FIG. 17).

In a case where the IP address is an IP address of an open proxy server (Yes of S40 in FIG. 17), the e-mail data 3 is discarded (S44 in FIG. 17), and the process is terminated. In this case, the verification process of e-mail data is also stopped.

In a case where the IP address is not an IP address of an open proxy server (No of S40 in FIG. 17), the WHOIS information acquisition unit 43 acquires information relating to the IP address of the transmission source terminal through the WHOIS lookup (S41 in FIG. 17). In addition, the IP reputation information acquisition unit 44 acquires information relating to the IP address of the transmission source terminal through the IP reputation lookup (S42 in FIG. 17).

The information acquired in S41 and S42 is then passed to the e-mail delivery unit 60 in association with the e-mail data 3 (S43 in FIG. 17).

Next, the attached file download notification unit 45 generates a URL for downloading the attached file uploaded in S36, and passes the generated URL to the e-mail delivery unit 60 (S52 in FIG. 17).

Thereafter, the e-mail delivery unit 60 provides the e-mail data 3 with the information acquired in the verification process of e-mail data, the information acquired in the upload and verification process of an attached file, and the URL generated in S52 (see, for example, FIG. 19), and transmits the results to the transmission destination (S53 in FIG. 17).

According to the present exemplary embodiment described above, it is possible to achieve the same operational effect as those in the first to seventh exemplary embodiments.

Hereinafter, examples of reference forms are appended.

1. An e-mail relay device including:
 a memory configured to store program instructions; and
 a processor configured to execute the program instructions including:
 an e-mail receiving unit that acquires an e-mail to be delivered before the e-mail reaches a transmission destination, the e-mail being transmitted from a transmission source mailer through simple mail transfer protocol (SMTP);
 a request notification unit that transmits, after the e-mail receiving unit acquires the e-mail to be delivered, a notification e-mail for allowing communication with a predetermined authentication server through Internet protocol (IP) by using a transmission source e-mail address of the e-mail to be delivered as a destination;
 a transmission source IP address acquisition unit that acquires, in a case where the transmission source terminal communicates with the predetermined authentication server after the notification e-mail is transmitted, an IP address of a transmission source terminal contained in an IP header of an IP packet transmitted/received during the communication; and
 a determination unit that determines the reliability of the e-mail to be delivered based on the IP address of the transmission source terminal.

2. The e-mail relay device according to 1, wherein the determination unit includes an open proxy verification unit that checks whether or not the IP address of the transmission source terminal is an IP address of an open proxy server, and determines that the e-mail to be delivered is unreliable in a case the IP address of the transmission source terminal is an IP address of an open proxy server.

3. The e-mail relay device according to 2, wherein in a case where the IP address of the transmission source terminal is an IP address of an open proxy server, the open proxy verification unit returns a request to the transmission source terminal for communication with the predetermined authentication server by bypassing an open proxy server, and when communication by bypassing an open proxy server is not performed within a predetermined time from the request, determines that the e-mail to be delivered is unreliable 4. The e-mail relay device according to any one of 1 to 3, wherein the determination unit includes a transmission source verification unit that acquires information relating to the IP address of the transmission source terminal from an external server, and determines the reliability of the e-mail to be delivered based on the acquired information.

5. The e-mail relay device according to any one of 1 to 4, the program instructions further including an e-mail data update unit that adds a determination result of the determination unit to the e-mail to be delivered.

6. The e-mail relay device according to 5, the program instructions further including an e-mail delivery unit that delivers the e-mail to be delivered, added with the determination result, to the transmission destination.

7. The e-mail relay device according to any one of 1 to 4, the program instructions further including an e-mail discarding unit that discards the e-mail to be delivered without sending the e-mail to the transmission destination, in a case where it is determined by the determination unit that the e-mail to be delivered is unreliable.

8. The e-mail relay device according to any one of 1 to 7, the program instructions further including a whitelist collation unit that checks whether or not the transmission source e-mail address of the e-mail to be delivered and/or an IP address of a transmission source e-mail server is contained in a whitelist, wherein the request notification unit transmits the notification e-mail in a case where the whitelist collation unit determines that the address is not contained in the whitelist.

9. The e-mail relay device according to any one of 1 to 8, the program instructions further including an attached file checking unit that determines whether a file is attached to the e-mail to be delivered, wherein the request notification unit transmits the notification e-mail in a case where the attached file checking unit determines that a file is attached to the e-mail.

10. An e-mail relay method executed by a computer, the method including:
   an e-mail receiving step of acquiring an e-mail to be delivered before the e-mail reaches a transmission destination, the e-mail being transmitted using SMTP from a transmission source mailer;
   a request notification step of transmitting, after the e-mail to be delivered is acquired in the e-mail receiving step, a notification e-mail for allowing communication with a predetermined authentication server over IP by using a transmission source e-mail address of the e-mail to be delivered as a destination;
   a transmission source IP address acquisition step of acquiring, in a case where the transmission source terminal communicates with the predetermined authentication server after the notification e-mail is transmitted, an IP address of a transmission source terminal contained in an IP header of an IP packet transmitted/received during the communication; and
   a determination step of determining the reliability of the e-mail to be delivered based on the IP address of the transmission source terminal.

10-2. The e-mail relay method according to 10, wherein the determination step includes executing an open proxy verification step of checking whether or not the IP address of the transmission source terminal is an IP address of an open proxy server, and determining that the e-mail to be delivered is unreliable in a case the IP address of the transmission source terminal is an IP address of an open proxy server.

10-3. The e-mail relay method according to 10-2, wherein the open proxy verification step includes returning a request, to the transmission source terminal, for communication with the predetermined authentication server by bypassing an open proxy server in a case where the IP address of the transmission source terminal is an IP address of an open proxy server, and determining that the e-mail to be delivered is unreliable in a case where communication by bypassing an open proxy server is not performed within a predetermined time from the request.

10-4. The e-mail relay method according to any one of 10 to 10-3, wherein the determination step includes executing a transmission source verification step of acquiring information relating to the IP address of the transmission source terminal from an external server, and determining the reliability of the e-mail to be delivered based on the acquired information.

10-5. The e-mail relay method according to any one of 10 to 10-4, wherein the computer further executes an e-mail data update step of adding a determination result of the determination step to the e-mail to be delivered.

10-6. The e-mail relay method according to 10-5, wherein the computer further executes an e-mail delivery step of delivering the e-mail to be delivered, added with the determination result, to the transmission destination.

10-7. The e-mail relay method according to any one of 10 to 10-4, wherein the computer further executes an e-mail discarding step of discarding the e-mail to be delivered without sending the e-mail to the transmission destination, in a case where it is determined in the determination step that the e-mail to be delivered is unreliable.

10-8. The e-mail relay method according to any one of 10 to 10-7, wherein the computer further executes a whitelist collation step of checking whether or not the transmission source e-mail address of the e-mail to be delivered and/or an IP address of a transmission source e-mail server is contained in a whitelist, and
   wherein the request notification step includes transmitting the notification e-mail in a case where it is determined in the whitelist collation step that the address is not contained in the whitelist.

10-9. The e-mail relay method according to any one of 10 to 10-8, wherein the computer further executes an attached file checking step of determining whether a file is attached to the e-mail to be delivered, and
   wherein the request notification step includes transmitting the notification e-mail in a case where it is determined in the attached file checking step that a file is attached to the e-mail to be delivered.

11. A non-transitory storage medium storing a program causing a computer to function as:
   an e-mail receiving unit that acquires an e-mail to be delivered before the e-mail reaches a transmission destination, the e-mail being transmitted using SMTP from a transmission source mailer;
   a request notification unit that transmits, after the e-mail receiving unit acquires the e-mail to be delivered, a notification e-mail for allowing communication with a predetermined authentication server over IP by using a transmission source e-mail address of the e-mail to be delivered as a destination;
   a transmission source IP address acquisition unit that acquires, in a case where the transmission source terminal communicates with the predetermined authentication server after the notification e-mail is transmitted, an IP address of a transmission source terminal contained in an IP header of an IP packet transmitted/received during the communication; and
   a determination unit that determines the reliability of the e-mail to be delivered based on the IP address of the transmission source terminal 11-2. The non-transitory storage medium according to 11, the program causing the determination unit to function as an open proxy verification unit that checks whether or not the IP address of the transmission source terminal is an IP address of an open proxy server, and determines that the e-mail to be delivered is unreliable in a case where the IP address of the transmission source terminal is an IP address of an open proxy server.

11-3. The non-transitory storage medium according to 11-2, wherein the open proxy verification unit returns a request, to the transmission source terminal, for communication with the predetermined authentication server by bypassing an open proxy server in a case where the IP address of the transmission source terminal is an IP address of an open proxy server, and determines that the e-mail to be delivered is unreliable in a case where communication by bypassing an open proxy server is not performed within a predetermined time from the request.

11-4. The non-transitory storage medium according to any one of 11 to 11-3, the program causing the determination unit to function as a transmission source verification unit that acquires information relating to the IP address of the transmission source terminal from an external server, and determines the reliability of the e-mail to be delivered based on the acquired information.

11-5. The non-transitory storage medium according to any one of 11 to 11-4, the program causing the computer to further function as an e-mail data update unit that adds a determination result of the determination unit to the e-mail to be delivered.

11-6. The non-transitory storage medium according to 11-5, the program causing the computer to further function as an e-mail delivery unit that delivers the e-mail to be delivered, added with the determination result, to the transmission destination.

11-7. The non-transitory storage medium according to any one of 11 to 11-4, the program causing the computer to further function as an e-mail discarding unit that discards the e-mail to be delivered without sending the e-mail to the transmission destination, in a case where it is determined by the determination unit that the e-mail to be delivered is unreliable.

11-8. The non-transitory storage medium according to any one of 11 to 11-7, the program causing the computer to further function as a whitelist collation unit that checks whether or not the transmission source e-mail address of the e-mail to be delivered and/or an IP address of a transmission source e-mail server is contained in a whitelist, wherein the request notification unit transmits the notification e-mail in a case where the whitelist collation unit determines that the address is not contained in the whitelist.

11-9. The non-transitory storage medium according to any one of 11 to 11-8, the program causing the computer to further function as an attached file checking unit that determines whether a file is attached to the e-mail to be delivered, wherein the request notification unit transmits the notification e-mail in a case where the attached file checking unit determines that a file is attached to the e-mail.

This application claims priority from Japanese Patent Application No. 2015-142131 filed on Jul. 16, 2015, the content of which is incorporated herein by reference in its entirety.

It is apparent that the present invention is not limited to the above exemplary embodiment, and may be modified and changed without departing from the scope and spirit of the invention.

What is claimed is:

1. An e-mail relay device comprising:
a memory configured to store program instructions; and
a processor configured to execute the program instructions including:
an e-mail receiving unit that acquires an e-mail to be delivered before the e-mail reaches a transmission destination, the e-mail being transmitted from a transmission source mailer through simple mail transfer protocol (SMTP);
a request notification unit that transmits, after the e-mail receiving unit acquires the e-mail to be delivered, a notification e-mail to a transmission source e-mail address of the e-mail to be delivered, the notification e-mail including an authentication URL to allow communication with a predetermined authentication server through Internet protocol (IP);
a transmission source IP address acquisition unit that acquires, in a case a transmission source terminal communicates with the predetermined authentication server after the notification e-mail is transmitted, an IP address of the transmission source terminal contained in an IP header of an IP packet transmitted and received during the communication; and
a determination unit that determines the reliability of the e-mail to be delivered based on the IP address of the transmission source terminal.

2. The e-mail relay device according to claim 1, wherein the determination unit includes an open proxy verification unit that checks whether or not the IP address of the transmission source terminal is an IP address of an open proxy server, and when the IP address is an IP address of an open proxy server, determines that the e-mail to be delivered is unreliable.

3. The e-mail relay device according to claim 2, wherein, in a case where the IP address of the transmission source terminal is an IP address of an open proxy server, the open proxy verification unit returns a request to the transmission source terminal for communication with the predetermined authentication server by bypassing an open proxy server, and when communication by bypassing an open proxy server is not performed within a predetermined time from the request, determines that the e-mail to be delivered is unreliable.

4. The e-mail relay device according to claim 1, wherein the determination unit includes a transmission source verification unit that acquires information relating to the IP address of the transmission source terminal from an external server, and determines the reliability of the e-mail to be delivered based on the acquired information.

5. The e-mail relay device according to claim 1, the program instructions further including an e-mail data update unit that adds a determination result of the determination unit to the e-mail to be delivered.

6. The e-mail relay device according to claim 5, the program instructions further including an e-mail delivery unit that delivers the e-mail to be delivered, added with the determination result, to the transmission destination.

7. The e-mail relay device according to claim 1, the program instructions further including an e-mail discarding unit that discards the e-mail to be delivered without sending the e-mail to the transmission destination in a case where it is determined by the determination unit that the e-mail to be delivered is unreliable.

8. The e-mail relay device according to claim 1, the program instructions further including a whitelist collation unit that checks whether or not the transmission source e-mail address of the e-mail to be delivered and/or an IP address of a transmission source e-mail server is contained in a whitelist,
wherein the request notification unit transmits the notification e-mail in a case where the whitelist collation unit determines that the address is not contained in the whitelist.

9. The e-mail relay device according to claim 1, the program instructions further including an attached file checking unit that determines whether a file is attached to the e-mail to be delivered,
wherein the request notification unit transmits the notification e-mail in a case where the attached file checking unit determines that a file is attached to the e-mail to be delivered.

10. An e-mail relay method executed by a computer, the method comprising:
an e-mail receiving step of acquiring an e-mail to be delivered before the e-mail reaches a transmission destination, the e-mail being transmitted using SMTP from a transmission source mailer;
a request notification step of transmitting, after the e-mail to be delivered is acquired in the e-mail receiving step, a notification e-mail to a transmission source e-mail address of the e-mail to be delivered, the notification e-mail including an authentication URL to allow communication with a predetermined authentication server over Internet protocol (IP);
a transmission source IP address acquisition step of acquiring, in a case where a transmission source terminal communicates with the predetermined authentication server after the notification e-mail is transmitted, an IP address of the transmission source terminal contained in an IP header of an IP packet transmitted/received during the communication; and a determination step of determining the reliability of the e-mail to be delivered based on the IP address of the transmission source terminal.

11. A non-transitory storage medium storing a program causing a computer to function as:

an e-mail receiving unit that acquires an e-mail to be delivered before the e-mail reaches a transmission destination, the e-mail being transmitted using SMTP from a transmission source mailer;

a request notification unit that transmits, after the e-mail receiving unit acquires the e-mail to be delivered, a notification e-mail to a transmission source e-mail address of the e-mail to be delivered, the notification e-mail including an authentication URL to allow communication with a predetermined authentication server over Internet protocol (IP);

a transmission source IP address acquisition unit that acquires, in a case where a transmission source terminal communicates with the predetermined authentication server after the notification e-mail is transmitted, an IP address of the transmission source terminal contained in an IP header of an IP packet transmitted/received during the communication; and a determination unit that determines the reliability of the e-mail to be delivered based on the IP address of the transmission source terminal.

* * * * *

UNITED STATES PATENT AND TRADEMARK OFFICE
CERTIFICATE OF CORRECTION

PATENT NO. : 10,341,266 B2
APPLICATION NO. : 15/210980
DATED : July 2, 2019
INVENTOR(S) : Akihiro Sagae and Takeshi Chiba Page 1 of 1

It is certified that error appears in the above-identified patent and that said Letters Patent is hereby corrected as shown below:

In the Specification

Column 9, Detailed Description, Line 56; After "unit", insert --30--

Column 17, Detailed Description, Line 28; After "device", insert --1--

Column 19, Detailed Description, Line 5; After "unit", insert --90--

Column 19, Detailed Description, Line 11; After "unit", insert --20--

Column 19, Detailed Description, Line 67; After "device", insert --1--

Signed and Sealed this
Twenty-ninth Day of October, 2019

Andrei Iancu
*Director of the United States Patent and Trademark Office*